US012539812B2

(12) United States Patent
Wesley et al.

(10) Patent No.: US 12,539,812 B2
(45) Date of Patent: Feb. 3, 2026

(54) POWERFOLD ACTUATOR FOR EXTERIOR MIRROR

(71) Applicant: Magna Mirrors of America, Inc., Holland, MI (US)

(72) Inventors: Mitchell J. Wesley, Wyoming, MI (US); Timothy W. Condron, Canton, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 251 days.

(21) Appl. No.: 18/556,131

(22) PCT Filed: Apr. 22, 2022

(86) PCT No.: PCT/US2022/071850
§ 371 (c)(1),
(2) Date: Oct. 19, 2023

(87) PCT Pub. No.: WO2022/226525
PCT Pub. Date: Oct. 27, 2022

(65) Prior Publication Data
US 2024/0181965 A1   Jun. 6, 2024

Related U.S. Application Data

(60) Provisional application No. 63/201,317, filed on Apr. 23, 2021.

(51) Int. Cl.
*B60R 1/074* (2006.01)
*G02B 7/182* (2021.01)

(52) U.S. Cl.
CPC .............. *B60R 1/074* (2013.01); *G02B 7/182* (2013.01)

(58) Field of Classification Search
CPC ................................ B60R 1/074; G02B 7/182
(Continued)

(56) References Cited

U.S. PATENT DOCUMENTS 5,636,071 A    6/1997  Mochizuki et al.
5,703,731 A   12/1997  Boddy et al.
(Continued)

FOREIGN PATENT DOCUMENTS

DE    102019122105 B3    11/2020

OTHER PUBLICATIONS

International Search Report and Written Opinion dated Jun. 24, 2022 from corresponding PCT Application No. PCT/US2022/071850.

*Primary Examiner* — Ricky D Shafer
(74) *Attorney, Agent, or Firm* — HONIGMAN LLP

(57) ABSTRACT

A vehicular exterior rearview mirror assembly includes a powerfold actuator and a mirror head. The powerfold actuator includes an electrically-operable motor that rotatably drives a gear that is engaged with an output gear to pivot the housing portion relative to the output gear and a pivot post. The powerfold actuator includes a base portion fixed relative to the pivot post and the mounting arm, a first gear, a housing portion, a lifter element non-rotatably disposed at the base portion, and a spring element that urges the first gear toward the base portion. With the mirror head at the drive position, the spring element acts on the base portion via the output gear and housing portion. During powered pivoting of the housing portion relative to the pivot post, the spring element acts on the base portion via the output gear and not via the housing portion or the lifter element.

58 Claims, 20 Drawing Sheets

(58) Field of Classification Search
USPC .......................................... 359/841, 872, 877
See application file for complete search history.

(56) References Cited

U.S. PATENT DOCUMENTS

| | | | |
|---|---|---|---|
| 5,900,999 A | 5/1999 | Huizenga et al. |
| 5,986,364 A | 11/1999 | Bingle et al. |
| 6,022,113 A | 2/2000 | Stolpe et al. |
| 6,130,514 A | 10/2000 | Oesterholt et al. |
| 6,133,704 A | 10/2000 | Yoshida et al. |
| 6,213,612 B1 | 4/2001 | Schnell et al. |
| 6,229,226 B1 | 5/2001 | Kramer et al. |
| 6,243,218 B1 | 6/2001 | Whitehead |
| 6,312,135 B1 | 11/2001 | Polzer |
| 6,322,221 B1 | 11/2001 | van de Loo |
| 6,322,721 B1 | 11/2001 | van de Loo |
| 6,362,548 B1 | 3/2002 | Bingle et al. |
| 6,390,630 B1 | 5/2002 | Ochs |
| 6,467,920 B2 | 10/2002 | Schnell et al. |
| 6,578,973 B2 | 6/2003 | Apfelbeck |
| 6,685,864 B2 | 2/2004 | Bingle et al. |
| 6,698,905 B1 | 3/2004 | Whitehead |
| 6,755,544 B2 | 6/2004 | Schnell et al. |
| 6,874,896 B2 | 4/2005 | Yoshida |
| 6,916,100 B2 | 7/2005 | Pavao |
| 6,926,414 B2 | 8/2005 | Van Stiphout |
| 6,981,774 B2 | 1/2006 | Dumont et al. |
| 7,008,068 B2 | 3/2006 | Yoshida |
| 7,070,287 B2 | 7/2006 | Foote et al. |
| 7,073,914 B2 | 7/2006 | Pavao |
| 7,080,914 B2 | 7/2006 | Boddy |
| 7,090,363 B1 | 8/2006 | Boddy et al. |
| 7,093,946 B2 | 8/2006 | Barve et al. |
| 7,104,663 B2 | 9/2006 | Whitehead |
| 7,159,992 B2 | 1/2007 | Foote |
| 7,171,726 B2 | 2/2007 | Kleissen et al. |
| 7,255,451 B2 | 8/2007 | McCabe et al. |
| 7,267,449 B1 | 9/2007 | Boddy et al. |
| 7,289,037 B2 | 10/2007 | Uken et al. |
| 7,314,285 B2 | 1/2008 | Ruse et al. |
| 7,360,932 B2 | 4/2008 | Uken et al. |
| 7,374,299 B2 | 5/2008 | Brouwer et al. |
| 7,392,567 B2 | 7/2008 | Brouwer |
| 7,452,088 B2 | 11/2008 | Brester et al. |
| 7,490,945 B2 | 2/2009 | Proctor |
| 7,533,997 B2 | 5/2009 | Onuki |
| 7,543,949 B2 | 6/2009 | van den Brink et al. |
| 7,547,855 B2 | 6/2009 | Brouwer et al. |
| 7,572,018 B2 | 8/2009 | Errando Smet et al. |
| 7,628,499 B2 | 12/2009 | Brouwer et al. |
| 7,722,199 B2 | 5/2010 | DeWard et al. |
| 7,744,229 B2 | 6/2010 | Oehmann et al. |
| 7,836,553 B2 | 11/2010 | Brouwer et al. |
| 7,887,202 B1 | 2/2011 | Peterson |
| 8,049,640 B2 | 11/2011 | Uken et al. |
| 8,129,642 B2 | 3/2012 | Brouwer et al. |
| 8,201,305 B2 | 6/2012 | Brouwer et al. |
| 8,277,059 B2 | 10/2012 | McCabe et al. |
| 8,313,202 B2 | 11/2012 | van Stiphout et al. |
| 8,366,284 B2 | 2/2013 | Flynn et al. |
| 8,508,831 B2 | 8/2013 | De Wind et al. |
| 8,529,108 B2 | 9/2013 | Uken et al. |
| 8,628,200 B2 | 1/2014 | van Stiphout et al. |
| 8,730,553 B2 | 5/2014 | De Wind et al. |
| 8,764,256 B2 | 7/2014 | Foote et al. |
| 8,915,601 B2 | 12/2014 | Foote et al. |
| 9,033,526 B2 | 5/2015 | Schuurmans et al. |
| 9,045,088 B2 | 6/2015 | Sakata |
| 9,067,541 B2 | 6/2015 | Sobecki et al. |
| 9,174,578 B2 | 11/2015 | Uken et al. |
| 9,242,606 B2 | 1/2016 | Mambourg |
| 9,346,403 B2 | 5/2016 | Uken et al. |
| 9,487,142 B2 | 11/2016 | Sobecki et al. |
| 9,598,016 B2 | 3/2017 | Blank et al. |
| 9,758,100 B2 | 9/2017 | Mendoza Vicioso et al. |
| 9,827,913 B2 | 11/2017 | De Wind et al. |
| 9,987,987 B2 | 6/2018 | van Stiphout et al. |
| 10,099,618 B2 | 10/2018 | Foote et al. |
| 10,562,453 B2 * | 2/2020 | van Stiphout .......... B60R 1/074 |
| 10,940,801 B1 | 3/2021 | Harris et al. |
| 11,173,843 B2 | 11/2021 | Peterson et al. |
| 11,214,198 B2 | 1/2022 | Harris et al. |
| 11,396,264 B2 | 7/2022 | Peterson et al. |
| 11,628,772 B2 | 4/2023 | Steffes et al. |
| 11,634,076 B2 * | 4/2023 | Peterson ................. B60R 1/076 359/841 |
| 11,634,077 B2 * | 4/2023 | Peterson ................. G02B 7/182 359/841 |
| 12,036,927 B2 * | 7/2024 | Peterson ................. B60R 1/074 |
| 2002/0135905 A1 | 9/2002 | Yoshida |
| 2003/0218812 A1 | 11/2003 | Foote et al. |
| 2004/0196578 A1 | 10/2004 | Dumont et al. |
| 2004/0218296 A1 | 11/2004 | Van Stiphout |
| 2005/0000058 A1 | 1/2005 | Kleissen et al. |
| 2005/0134979 A1 | 6/2005 | Yoshida |
| 2005/0141111 A1 | 6/2005 | Yoshida |
| 2006/0103957 A1 | 5/2006 | Olijnyk et al. |
| 2006/0274442 A1 | 12/2006 | Brouwer et al. |
| 2007/0029179 A1 | 2/2007 | Brouwer et al. |
| 2007/0084707 A1 | 4/2007 | van den Brink et al. |
| 2007/0211356 A1 | 9/2007 | Brester et al. |
| 2008/0168623 A1 | 7/2008 | Brouwer et al. |
| 2008/0297927 A1 * | 12/2008 | Onuki ..................... B60R 1/074 359/841 |
| 2009/0237820 A1 | 9/2009 | McCabe et al. |
| 2009/0303625 A1 | 12/2009 | van Stiphout et al. |
| 2010/0238570 A1 | 9/2010 | Reedman et al. |
| 2010/0275411 A1 | 11/2010 | Brouwer |
| 2012/0067497 A1 | 3/2012 | Hansel et al. |
| 2013/0010379 A1 | 1/2013 | Sakata |
| 2013/0321941 A1 | 12/2013 | van Stiphout et al. |
| 2017/0088054 A1 | 3/2017 | Casals et al. |
| 2018/0345862 A1† | 12/2018 | van Stiphout |
| 2019/0092241 A1 | 3/2019 | Fujisaki et al. |
| 2019/0275943 A1 | 9/2019 | Cretin et al. |
| 2020/0223364 A1 | 7/2020 | Peterson et al. |
| 2020/0353867 A1 | 11/2020 | Huizen et al. |
| 2021/0213880 A1 | 7/2021 | Esser |
| 2021/0261053 A1 | 8/2021 | Peterson et al. |
| 2021/0316664 A1 | 10/2021 | Baur |
| 2021/0331625 A1 | 10/2021 | Huizen et al. |
| 2022/0073001 A1 | 3/2022 | Peterson et al. |
| 2022/0355736 A1 | 11/2022 | Peterson et al. |

\* cited by examiner
† cited by third party

POWERFOLD ACTUATOR FOR EXTERIOR MIRROR

CROSS REFERENCE TO RELATED APPLICATION

The present application is a 371 U.S. national stage entry of PCT Application No. PCT/US2022/071850, filed Apr. 22, 2022, which claims the filing benefits of U.S. provisional application Ser. No. 63/201,317, filed Apr. 23, 2021, which is hereby incorporated herein by reference in its entirety.

FIELD OF THE INVENTION

The present invention relates generally to the field of exterior rearview mirror assemblies for vehicles and, more particularly, to the field of powerfold exterior rearview mirror assemblies.

BACKGROUND OF THE INVENTION

It is known to provide an automotive exterior rearview mirror assembly that includes a foldable mirror assembly, such as a powerfold mirror where the mirror head is pivotable via an actuator between a drive or use position and a folded or park position.

SUMMARY OF THE INVENTION

A rearview mirror assembly (such as an exterior mirror assembly mounted at a side of an equipped vehicle) includes a powerfold actuator system to pivot the mirror head of the mirror assembly between a drive or use position and a folded or park position responsive to a user input. During operation of the powerfold actuator, the actuator functions to lift the mirror head relative to the mounting base or arm (at the vehicle) so that there are reduced forces and reduced friction at the cut line seal that is disposed between the mirror head and the mounting arm. The actuator includes a lifter element that limits rotation of the output gear relative to the base portion during powered pivoting of the mirror head relative to the pivot post. The actuator is configured so that, when the mirror head is in the drive position, the spring load is through the output gear and lower housing portion to the base portion, and, when the mirror head is electrically pivoting via operation of the actuator motor, the spring load is through the output gear directly to the base portion. During such powered pivoting of the housing portion relative to the pivot post, the spring load is not through the housing portion or the lifter element in all positions of the mirror head relative to the base portion. The actuator includes a flexible or resilient element that protrudes radially outward from the output gear to engage a tab at the housing portion to limit rotation of the output gear relative to the housing portion in one direction.

An aspect of the present disclosure provides a vehicular exterior rearview mirror assembly that includes (i) a mounting arm having a first end configured for attachment at a side of a vehicle and a second end distal from the first end, (ii) a mirror head pivotally mounted at the second end of the mounting arm, with the mirror head including a mirror casing and a reflective element, and (iii) a powerfold actuator. The powerfold actuator includes an electrically operable motor that, when electrically operated, pivots the mirror head relative to the mounting arm between at least the folded position and the drive position. The powerfold actuator includes a pivot assembly that includes a pivot post and a base portion fixed relative to the pivot post and fixed relative to the mounting arm (with the pivot post protruding upward from the distal end region of the mounting arm and establishing a pivot axis for the mirror head). The base portion has a base detent or cam surface (such as a ramped surface that circumscribes the pivot post at the base portion). The powerfold actuator further includes an output gear that circumscribes the pivot post and that has a lower cam surface. The powerfold actuator further includes a housing portion (such as a lower housing portion of a housing of the powerfold actuator) attached at the mirror head that circumscribes the pivot post and has an upper cam surface. The powerfold actuator further includes a lifter element that receives the pivot post therethrough and that has a receiving portion that is configured to (when the lifter element is lifted with the lower housing portion) receive the lower cams of the output gear therein to limit rotation of the output gear about the pivot post. A spring element is disposed between an upper surface of the output gear and an upper end of the pivot post (such as at a radially protruding ring that is received in a groove or channel at least partially around the upper end region of the pivot post or that is welded or otherwise affixed at the upper end region of the pivot post). The spring element exerts a biasing force downward to urge the output gear downward along the pivot post toward the base portion. The electrically operable motor is disposed at the housing portion and is operable (when the motor is electrically powered or operated) to rotatably drive a gear (such as a worm gear or the like affixed at an output shaft of the motor) that is engaged with the output gear to pivot the housing portion relative to the output gear and the pivot post (to cause the housing portion and the mirror head to move or rotate or pivot about the pivot axis defined by the longitudinal axis of the pivot post). With the mirror head at the drive position, a spring load of the spring element is directed through the output gear and the housing portion to the base portion to provide stability to the mirror head in the drive position. That is, the spring element acts on the base portion via the output gear and the housing portion when the mirror head is in the drive position. During powered pivoting (i.e., operation of the electrically operated motor to pivot the mirror head) of the housing portion relative to the pivot post, the spring load is directly through the output gear to the base portion. During powered pivoting of the housing portion relative to the pivot post, the spring load is not through the housing portion. During powered pivoting of the housing portion relative to the pivot post, the spring load is not through the lifter element. In other words, the spring element acts on the base portion via the output gear and not via the housing portion or lifter element during powered pivoting of the housing portion relative to the pivot post. The vehicular exterior rearview mirror assembly may include one or more of the following optional features.

Optionally, when the mirror head is in the drive position, the lower cam surface of the output gear may engage the upper cam surface of the housing portion. With the mirror head at the drive position, the lower surface of the housing portion may be nested with a detent surface of the base portion. Further, when the powerfold actuator operates to pivot the mirror head from the drive position toward the folded position, the output gear may rotate relative to the pivot post and the lower cam surface of the output gear disengages from the upper cam surface of the housing portion and engages an upper cam surface of the base portion. As the output gear rotates relative to the pivot post, the lower cam surface of the output gear may travel along the upper cam surface of the base portion, and the lower cam surface of the output gear may be spaced from the upper cam surface of the lower housing and the lifter element. Moreover, rotation of the output gear relative to the pivot post is stopped by a cam of the upper cam surface of the base portion. For example, rotation of the output gear relative to the pivot post may be stopped when the lower cam surface of the output gear engages an uppermost protrusion of the upper cam surface of the base portion. Additionally, with rotation of the output gear stopped, further operation of the motor may rotate the housing portion and the housing portion and lifter element rise upward toward the output gear and the spring load is not through the housing portion or the lifter element. Thus, when the output gear disengages from the upper cam surface of the housing portion and engages the upper cam surface of the base portion, the spring element shifts from acting on the housing portion via the output gear to acting on the base portion via the output gear. That is, the spring element acts on the base portion via the output gear and not via the housing portion or the lifter element.

Furthermore, as the housing portion and lifter element rise upward toward the output gear, the receiving portion of the lifter element may at least partially receive lower cams of the lower cam surface of the output gear to limit rotation of the output gear. With the lower cams of the lower cam surface at least partially received in the receiving portion of the lifter element, a first portion of each of the lower cams may be received in the receiving portion and a second portion of each of the lower cams may engage the upper cam surface of the base portion. The receiving portion of the lifter element may only partially receive the lower cams of the lower cam surface so that the spring element acts on the base portion and not the lifter element. Also, as the mirror head moves from the folded position toward the drive position, the housing portion may move upward relative to the base portion to raise the mirror head relative to the mounting arm.

Optionally, as the mirror head moves from the drive position toward the folded position, the housing portion moves upward relative to the base portion to raise the mirror head relative to the mounting arm. Further, as the housing portion moves upward relative to the base portion, the lifter element may move into engagement with the output gear to limit rotation of the output gear relative to the pivot post. Optionally, during manual pivoting of the housing portion relative to the pivot post, the output gear and the housing portion may pivot together and in tandem relative to the pivot post. Optionally, during manual pivoting of the housing portion relative to the pivot post, the housing portion may move upward relative to the base portion as a lower surface of the housing portion travels along a detent surface of the base portion.

Optionally, the powerfold actuator may include a resilient element at an upper end of the output gear that has a radially protruding tab that engages a corresponding tab at the housing portion to limit rotation of the housing portion relative to the output gear to stall the motor at stop locations. The resilient element may flex radially to allow movement of the tab of the resilient element to avoid stalling the motor at other locations separate from the stop locations.

Optionally, the lifter element may be non-rotatably disposed at the base portion and may be longitudinally movable along the base portion and the pivot post. Optionally, the lifter element circumscribes the pivot post and is disposed radially inboard of the upper cam surface of the housing portion. Further, the lifter element may include a portion of the housing portion, where the lifter element is non-rotatable relative to the base portion and the housing portion is rotatable relative to the lifter element, and where the lifter element is longitudinally movable along the base portion and the pivot post according to longitudinal movement of the housing portion.

Optionally, the lower cam surface of the output gear may include one or more cams disposed radially about a lower surface of the output gear, where each cam of the one or more cams of the lower cam surface of the output gear includes (i) an inner portion configured to engage the receiving portion of the lifter element, and (ii) an outer portion radially outboard of the inner portion and configured to engage the upper cam surface of the housing portion. Moreover, the inner portion of the one or more cams of the lower cam surface of the output gear is further configured to engage the base cam surface of the base portion.

Optionally, the lifter element may include a lower cam surface configured to interface with a corresponding cam surface of the housing portion. The corresponding cam surface of the housing portion is disposed at an inner surface of the housing portion and is radially inboard of the upper cam surface of the housing portion.

Optionally, the mirror head may be pivotally mounted at the second end of the mounting arm. Optionally, with the mirror head at the drive position, a spring load of the spring element is through the first gear and housing portion to the base portion. Further, during powered pivoting of the housing portion relative to the pivot post, the spring load may be through the first gear directly to the base portion. Moreover, during powered pivoting of the housing portion relative to the pivot post, the spring load may be through the first gear directly to the base portion. Additionally, during powered pivoting of the housing portion relative to the pivot post, the spring load may not be through the housing portion and the spring load may not be through the lifter element.

These and other objects, advantages, purposes and features of the present invention will become apparent upon review of the following specification in conjunction with the drawings.

DESCRIPTION OF THE PREFERRED EMBODIMENTS

Figure 1:
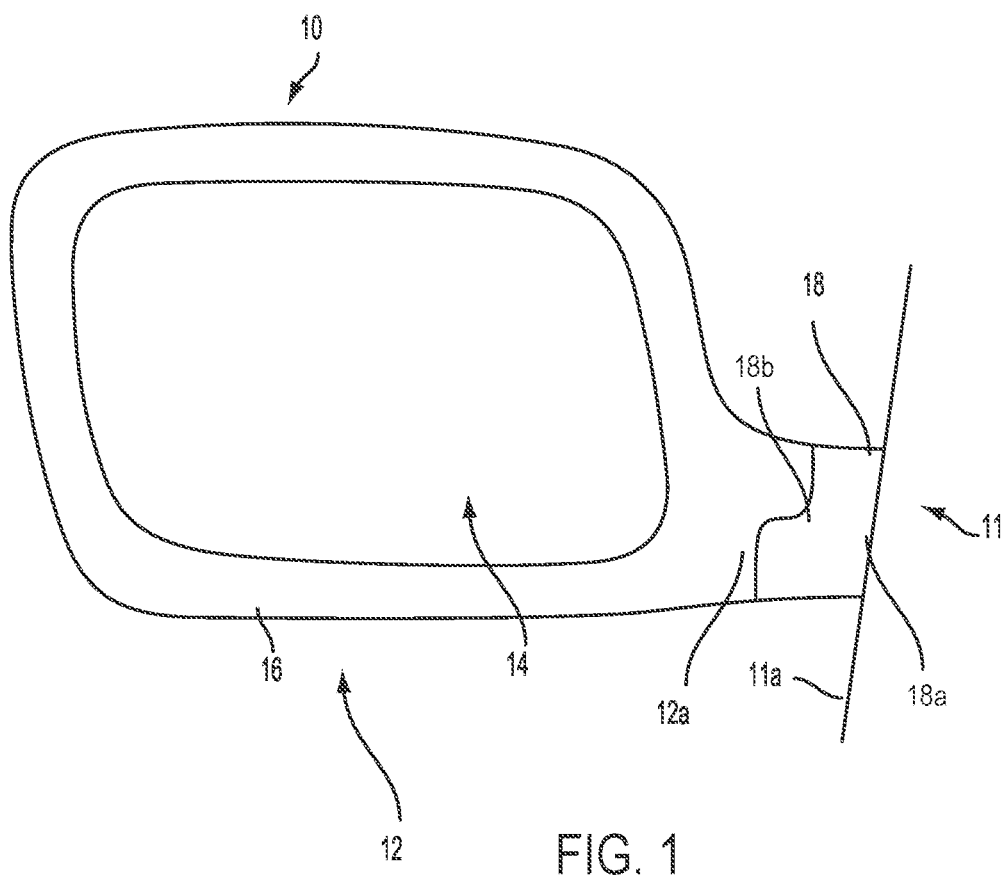
FIG. 1 is a perspective view of an exterior rearview mirror assembly having a powerfold actuator.

Referring now to the drawings and the illustrative embodiments depicted therein, an exterior rearview mirror assembly 10 for a vehicle 11 includes a mirror head 12 that includes a mirror reflective element 14 received in and/or supported at or by a mirror shell or casing 16 of the mirror head portion 12 (FIG. 1). The mirror head portion 12 includes a mounting portion 12a that is pivotally or movably mounted to a mounting arm or base or portion 18. The mirror assembly 10 comprises a powerfold mirror (where the mirror head portion may be pivoted via an actuator assembly or adjustment device), and may comprise a breakaway mirror (where the mirror head portion may be manually pivoted about the mounting arm or base). The mounting arm or base 18 of the mirror assembly 10 is mounted at the side 11a of a host or subject vehicle 11, with the reflective element 14 providing a rearward field of view along the respective side of the vehicle to the driver of the vehicle, as discussed below. The mounting arm 18 has a first end 18a configured for attachment at the side 11a of the vehicle 11 and a second end 18b distal from the first end 18a. The mirror head 12 is pivotally mounted at the second end 18b of the mounting arm 18 via the mounting portion 12a of the mirror head 12. The mirror head 12 includes the mirror casing 16 and the mirror reflective element 14.

Figure 3:
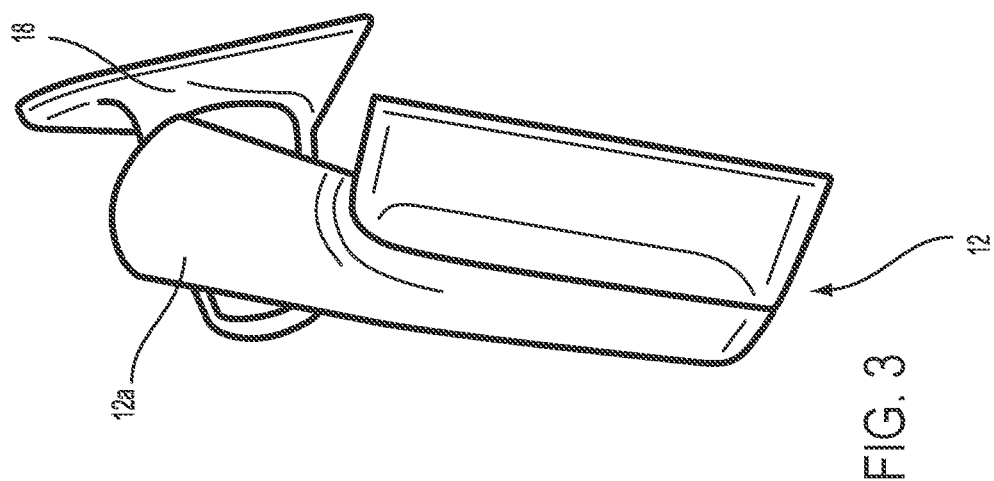
FIG. 3 is a top plan view of the exterior rearview mirror assembly, with the mirror head pivoted to a folded or non-use position.
Figure 2:
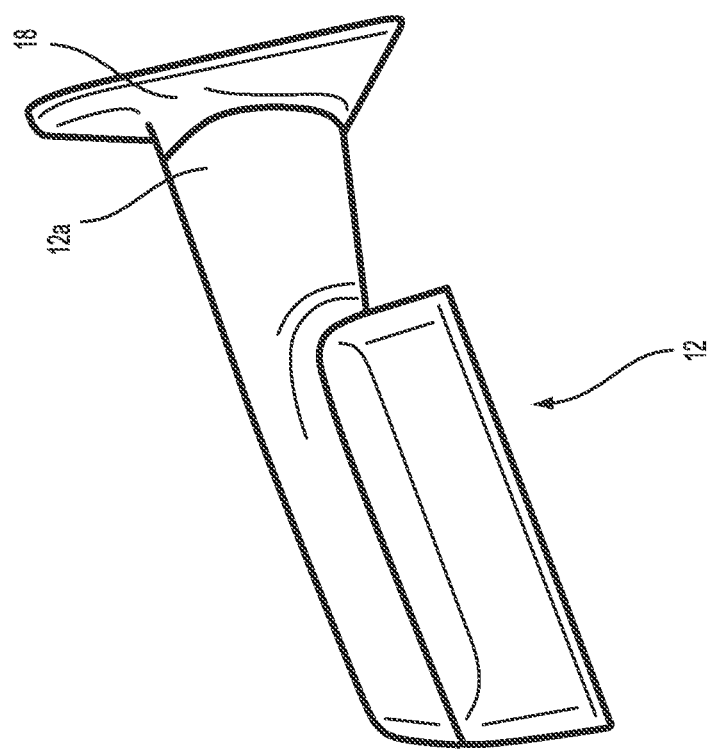
FIG. 2 is a top plan view of the exterior rearview mirror assembly, with the mirror head pivoted to a drive or use position.
Figure 4:
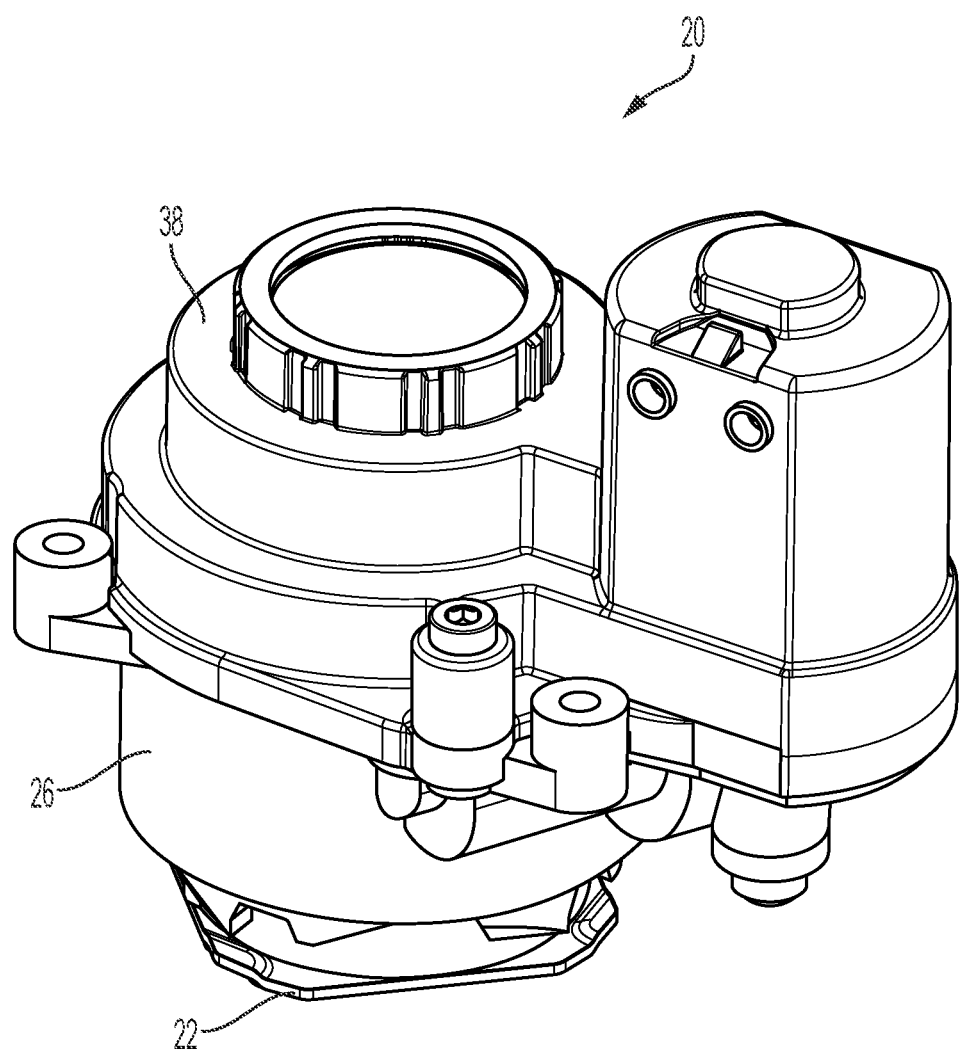
FIG. 4 is a perspective view of the actuator of the exterior rearview mirror assembly.
Figure 5:
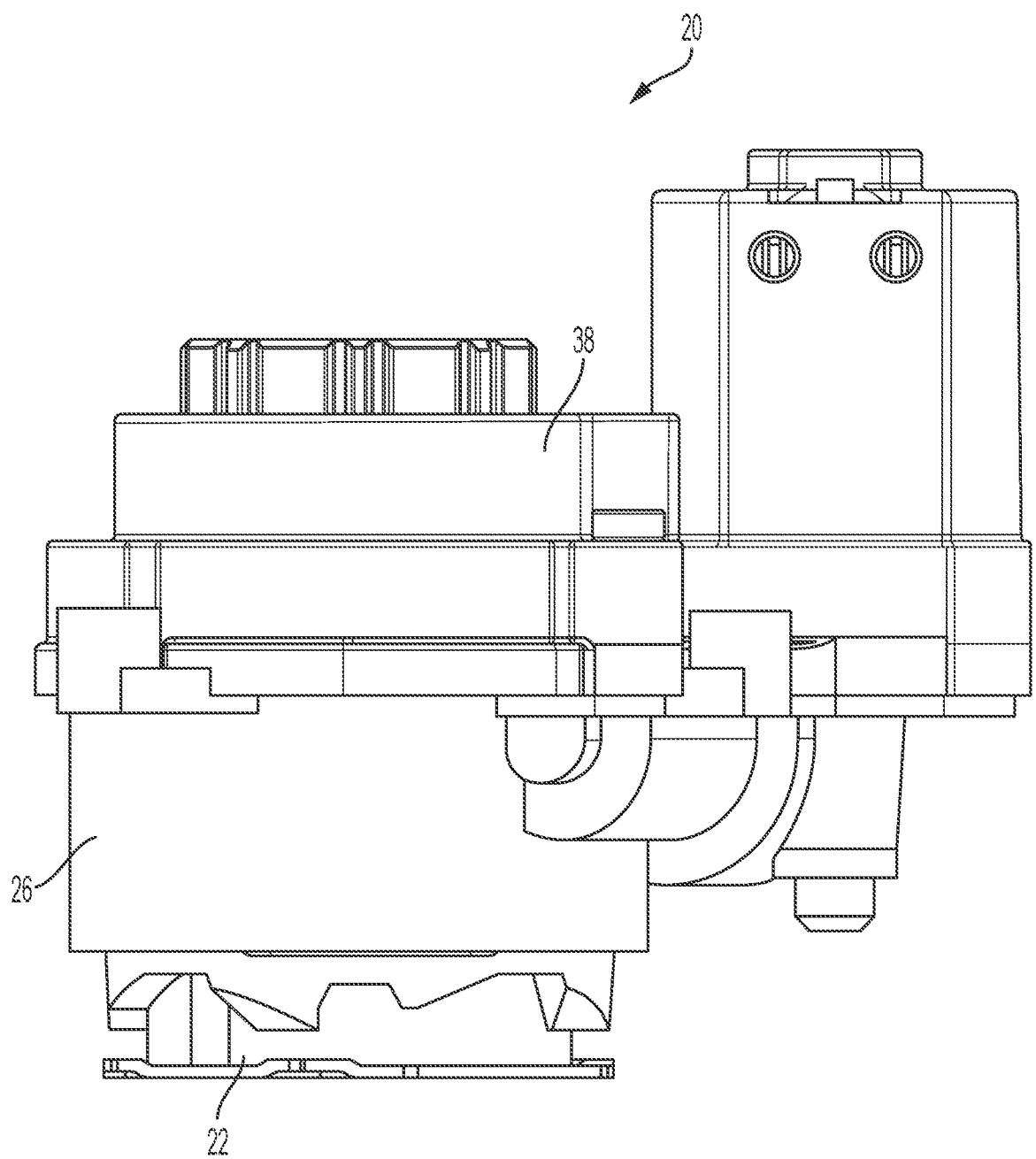
FIG. 5 is a side elevation of the actuator of FIG. 4.
Figure 6:
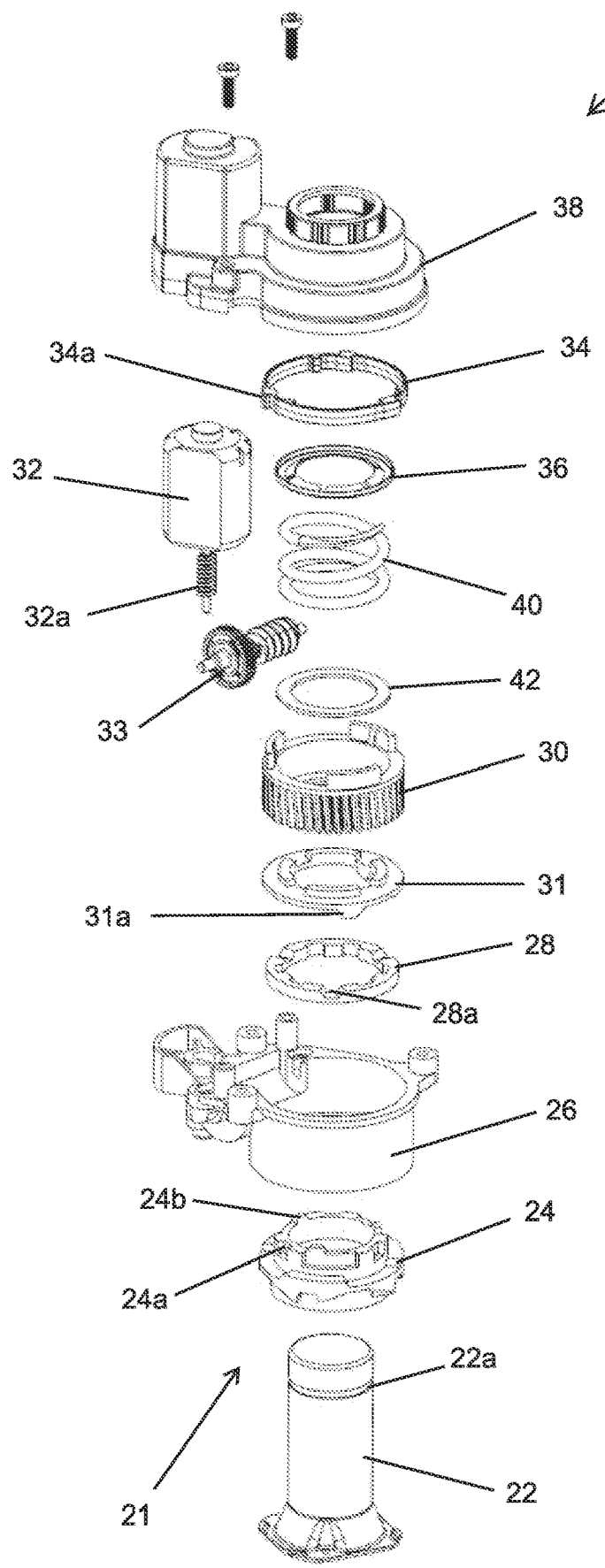
FIGS. 6 and 7 are exploded perspective views of the actuator of FIG. 4.
Figure 7:
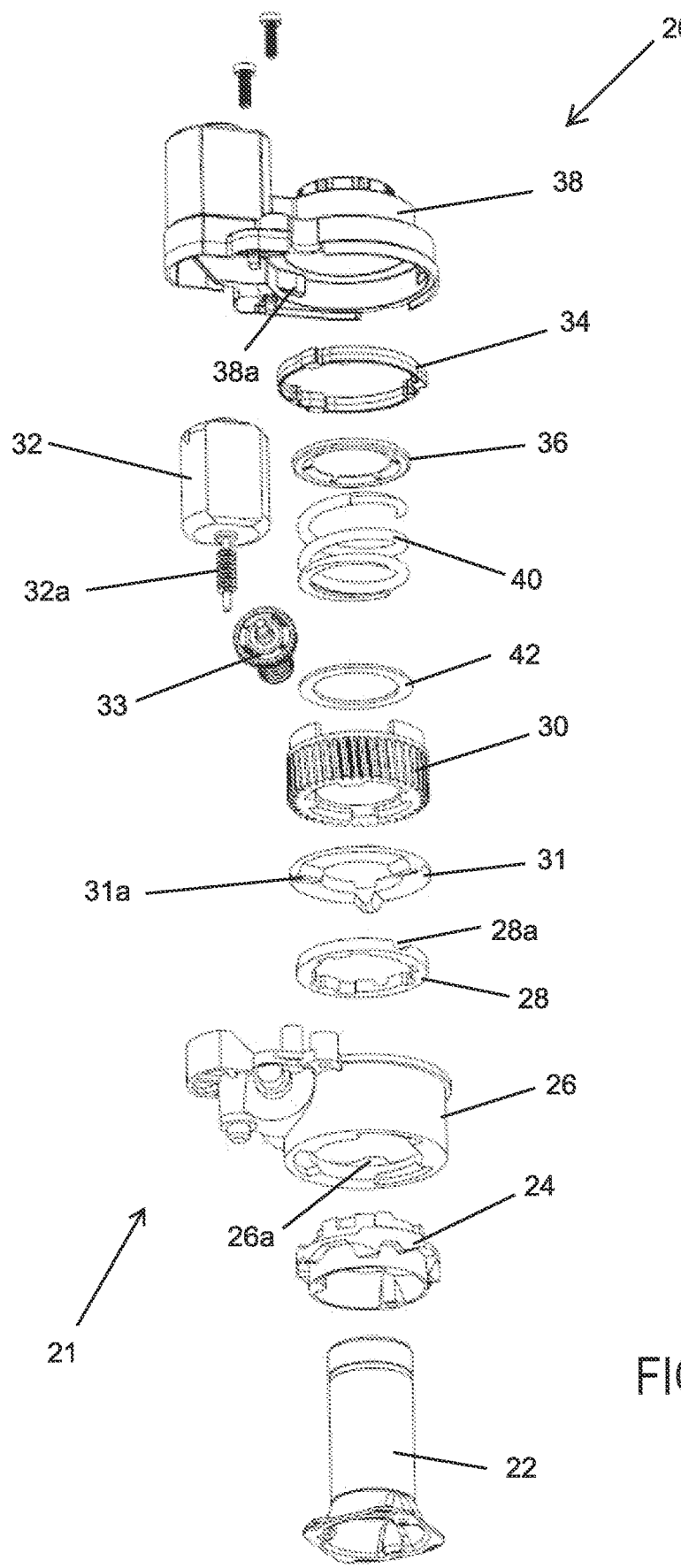
Figure 8:
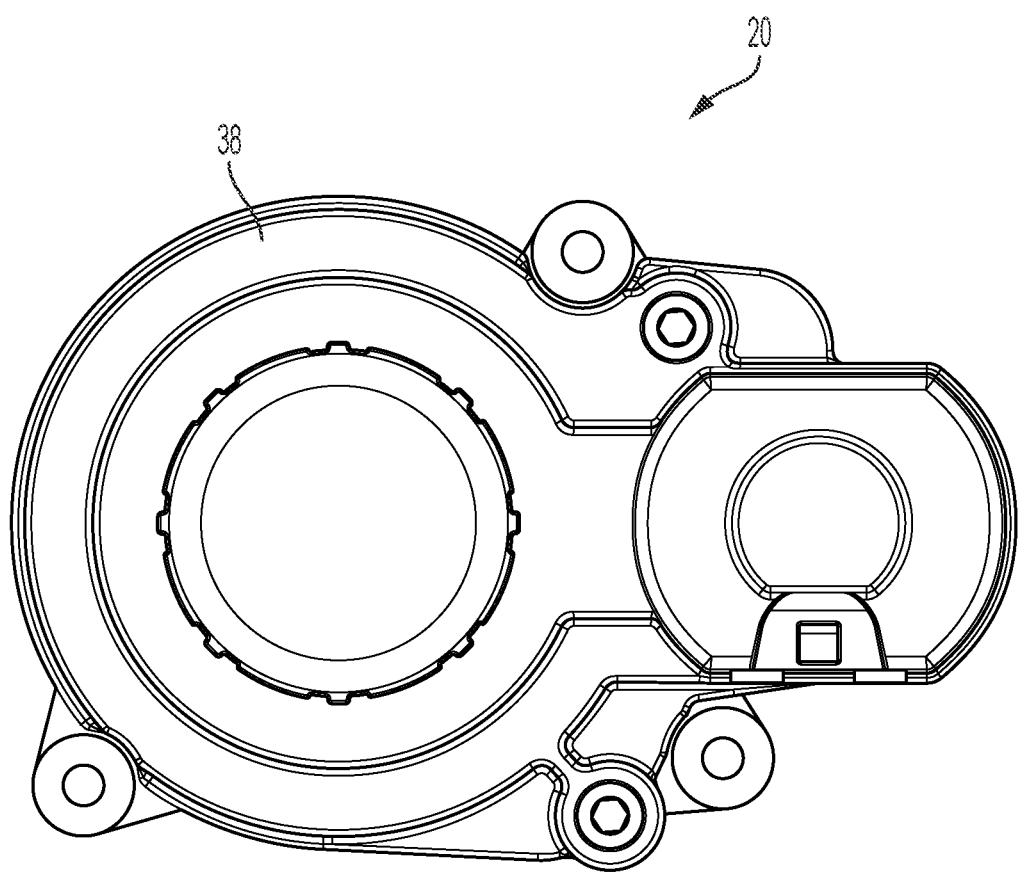
FIG. 8 is a top view of the actuator of FIG. 4.

The mirror assembly 10 includes a powerfold mirror assembly that includes an actuator 20 that is operable to pivot the mirror head 12 (including the mirror casing 16 and reflective element 14) relative to the mounting arm or base 18. The actuator operates, responsive to a user input, to pivot the mirror head 12 between a plurality of detent positions, including a use or drive position (FIG. 2), where the mirror head 12 is extended relative to the side of the vehicle and the mounting arm 18 to provide the view to the driver of the vehicle rearward and along the respective side of the vehicle, and a folded or park position (FIG. 3), where the mirror head 12 is folded or pivoted in from the extended position relative to the mounting arm 18 to be disposed along the side of the vehicle. The powerfold actuator 20 includes an electrically operable motor and, when the powerfold actuator is operated, the electric motor is electrically operated to pivot the mirror head relative to the mounting arm between at least the folded position and the drive position. The mirror head is also pivotable manually to either the use or folded position. Optionally, the mirror head may also be pivoted to a fully forward position, where the mirror head 12 is pivoted or rotated beyond the drive position. A seal may be disposed along the interface between the mounting portion 12a of the mirror head 12 and the mounting arm or base 18. The actuator and mirror assembly may utilize aspects of the actuators and mirror assemblies described in U.S. Pat. Nos. 11,173,843; 9,487,142; 9,067,541 and/or 7,887,202, and/or U.S. Publication Nos. US-2021-0261053 and/or U.S. patent application Ser. No. 17/452,414, filed Oct. 27, 2021, now U.S. Pat. No. 11,628,772, which are all hereby incorporated herein by reference in their entireties.

As shown in FIGS. 4-8, the mirror actuator 20 includes a pivot assembly 21 that has a base post structure that has a pivot tube or post 22 and a base portion or detent 24 (that may be separate elements joined together or that may be integrated as a single element), with the pivot post 22 providing or defining a pivot axis for the mirror head 12. The post 22 is fixedly attached at the mounting arm 18 and thus the base portion 24 fixed relative to the pivot post 22 is fixed relative to the mounting arm 18. The post 22 extends from the base detent 24 and through a lower housing or bracket 26, a lifter element 28 and an output gear 30. The actuator housing or lower housing or bracket 26 is rotatably disposed at the post 22 and houses a motor 32 and is non-rotatably disposed or attached at the mirror head 12. In other words, the lower housing 26 is rotatable about the pivot axis of the pivot post 22 and the mirror head 12 may be fixed to the lower housing 26 so that the mirror head 12 may pivot about the pivot post 22 according to movement of the lower housing 26. The post 22 extends from the base portion 24 and through the lower housing 26 and the lifter element 28 and the output gear 30 and through an upper resilient element 34, and has a retaining ring or palnut 36 affixed at its upper end (whereby the retaining ring 36 may be received at a groove of the tube or post 22). An upper housing portion 38 attaches to the lower housing 26 and encloses the base post 22, motor 32, detents and gears. The retainer ring 36 is rigidly fastened to the post 22, such that the retainer 36, post 22 and base 24 are effectively a single member or element and provide axial and rotational ground reference for all motions and forces. The lifter element 28 is non-rotatably keyed with the base 24 and post 22. The resilient element 34 is disposed at an upper part of the output gear 30 and is configured to engage the lower housing to assist in stalling the motor. A spring or spring element 40 is disposed between the retainer 36 and the output gear 30 to urge the output gear toward the base 24. The spring may engage a slip washer 42 (e.g., a Teflon washer or the like) at the output gear to reduce friction between the end of the spring and the output gear.

Thus, the pivot assembly 21 includes the pivot post 22 and the base portion 24 fixed relative to the pivot post and fixed relative to the mounting arm 18. The pivot assembly 21 further includes at least the output gear 30, the lower housing portion 26 attached at the mirror head 12, the lifter element 28 non-rotatably disposed at the base portion 24, and the spring element 40 disposed between the output gear 30 and an upper end of the pivot post 22. In the illustrated embodiment, the spring element 40 is retained between the retaining ring 36 rigidly received and fixed at the groove 22a formed along an upper end of the pivot post 22 and the slip washer 42 at the output gear 30. The spring element 40 urges the output gear 30 toward the base portion 24.

The motor 32 is disposed within the housing portion and is actuated to rotatably drive a motor output gear 32a that rotatably drives a main gear 33 of the housing, which engages the output gear 30 and rotates the lower housing 26 and the upper housing 38 (collectively, the housing) relative to the output gear about the pivot post 22 until a hard stop is engaged, whereby the motor will stall or stop, with the mirror head retained at the extended or drive position via detents. The actuator is configured such that a hard stop is provided at the appropriate locations when the mirror head 12 is pivoted via driving of the motor. The resilient element 34 of the actuator functions to stop the output gear's rotation as it cinches in the drive position. As the output gear begins to cinch, the resilient element limits or precludes further rotation of the housing relative to the gear and thereby stalls the motor. For example, the resilient element 34 may include one or more protrusions 34a radially arranged along an outer perimeter of the resilient element and configured to engage corresponding tabs or protrusions 38a along an inner surface of the upper housing 38 when the mirror head is pivoted to the drive or folded position. When the protrusions 34a of the resilient element 34 engage the tabs 38a of the upper housing 38, the motor is cinched and ceases operation. The position of the protrusions 34a around the resilient element 34 and the position of the tabs 38a around the upper housing 38 correspond to the drive and folded positions and the positioning of the detents at the drive and folded positions. Operating the motor to pivot the mirror head between the drive position and the folded position may be referred to as powered pivoting.

Figure 17:
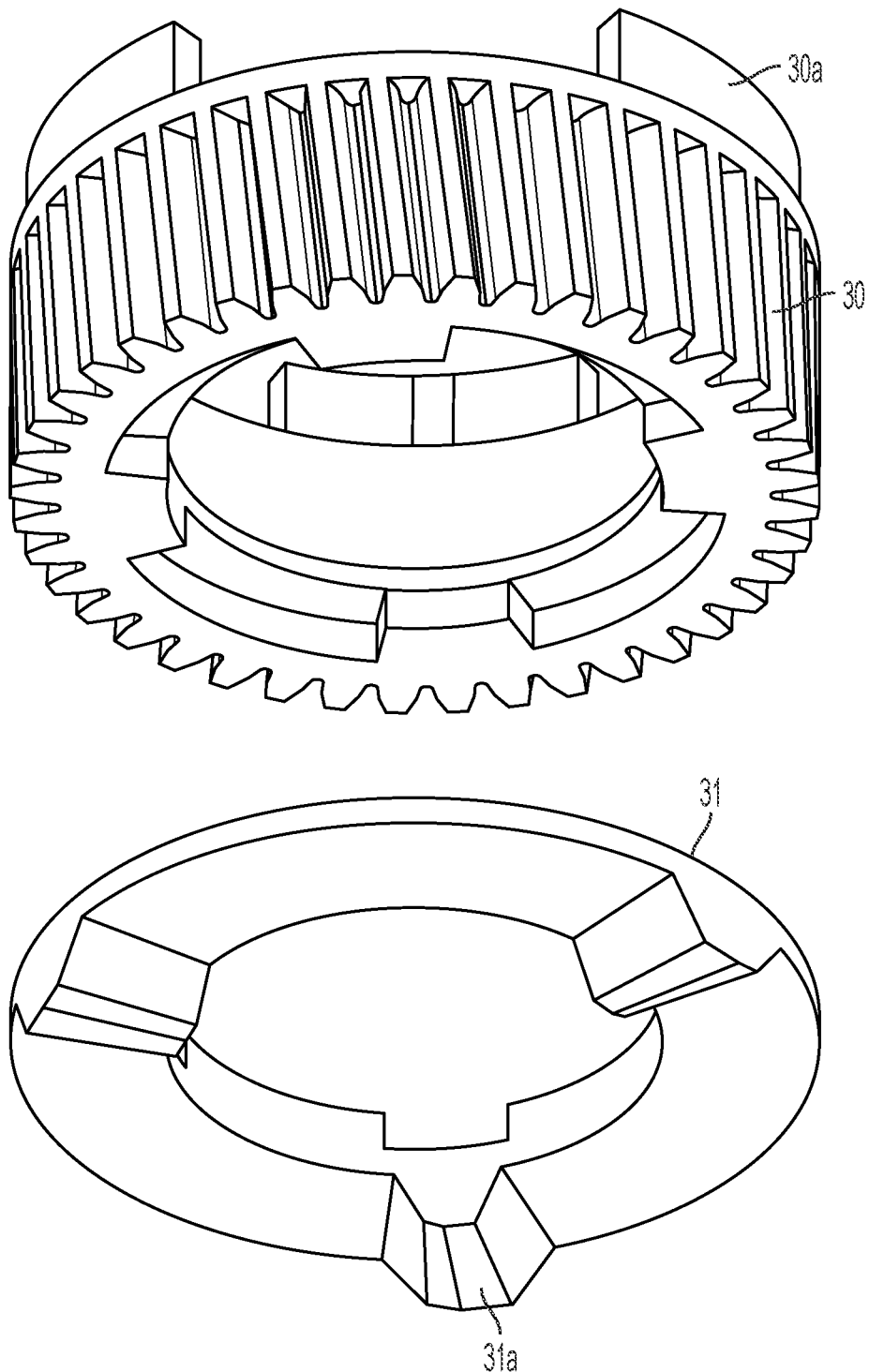
FIGS. 17 and 18 are perspective views of the output gear and lower cam plate of the actuator.
Figure 18:
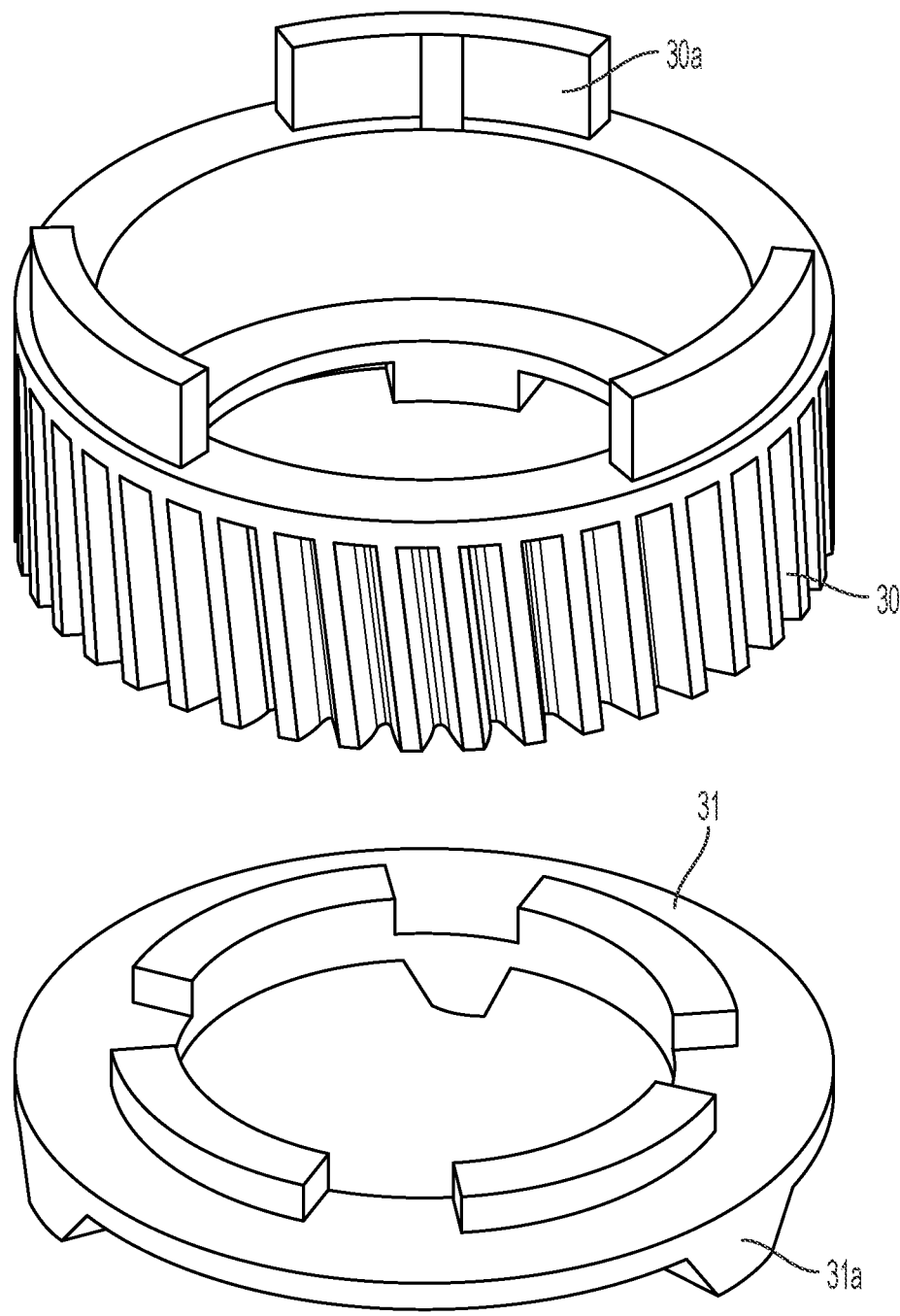

As shown in FIGS. 17 and 18, the output gear 30 includes a lower cam element 31 attached at the lower end of the output gear. The lower cam element 31 may comprise a separate part that is formed separate from and attached to the lower end of the output gear 30, or the output gear 30 and lower cam element 31 may comprise a unitarily formed part. The lower cam element 31 is fixedly attached at the output gear 30 and includes a plurality of lower cams 31a protruding downward therefrom. The upper end of the output gear 30 includes a plurality of upper cams or protrusions 30a that are configured to engage the resilient element 34, which includes radial protrusions 34a for engaging tabs 38a (see FIG. 7) at the inner surface of the upper housing portion 38. The output gear 30 and the resilient element 34 may utilize aspects of the gears and elements and actuators described in U.S. Publication No. US-2021-0261053, incorporated above.

The lower cams 31a of the lower cam element 31 are configured to be at least partially received in respective notches or receiving portions 28a at the upper end of the lifter element 28 to limit rotation of the output gear 30 when the lifter is lifted upward and the lower cams 31a are received in the notches 28a. The lifter element 28 rests within the lower housing 26 and the lower housing 26 is configured to lift or raise the lifter element 28 upward as the lower housing 26 is pivoted out of its detent (e.g., drive) position or state during pivoting of the mirror head between the detent positions. In other words, axial movement of the lower housing 26 along the pivot post 22 when the mirror head 12 is pivoted between the drive and folded position imparts axial movement of the lifter element 28 along the pivot post 22, and the lower cams 31a are received in corresponding notches 28a of the lifter element 28 to preclude pivotal or rotational movement of the output gear 30 by way of the fixed relationship between the output gear 30 and the lower cam element 31.

Figure 9:
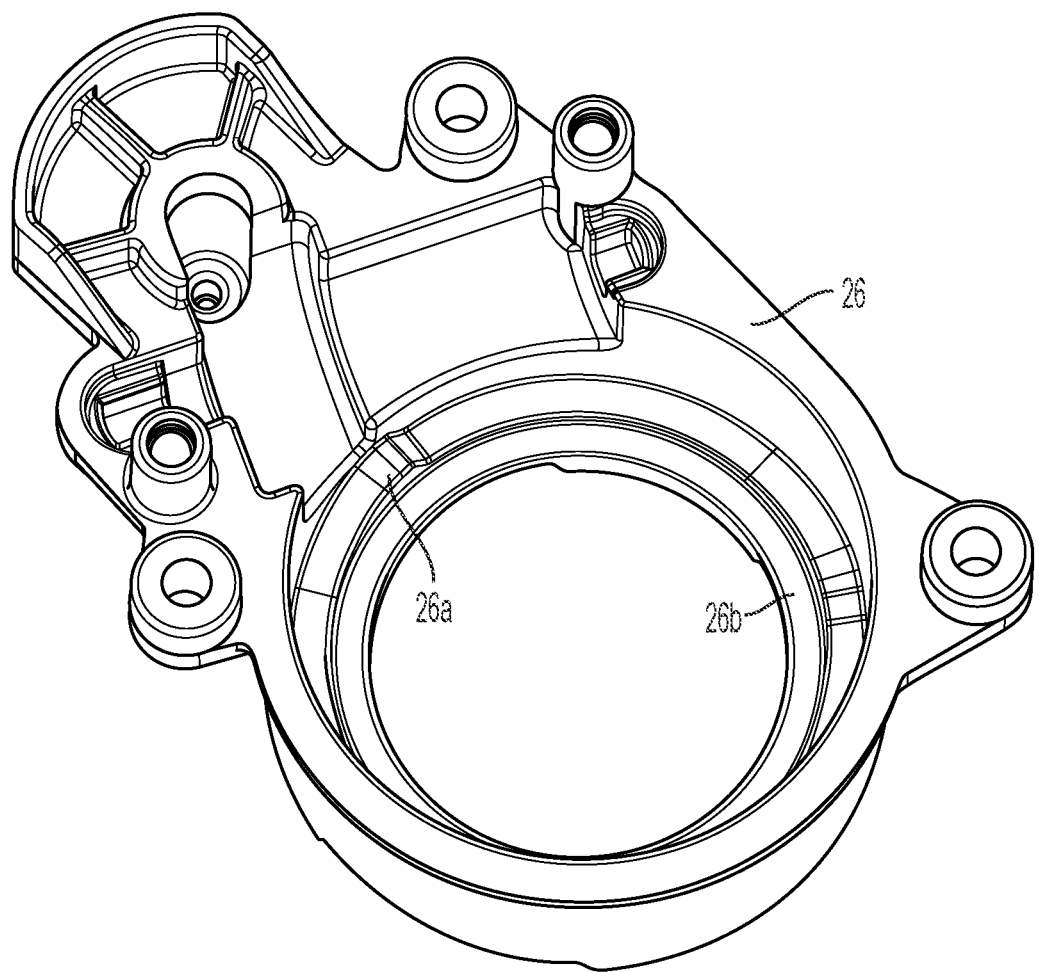
FIG. 9 is a perspective view of the lower housing portion of the actuator.

As shown in FIG. 9, the lower inner surface of the lower housing includes a plurality of cams or protrusions 26a that protrude upward and that are configured to engage the lower cams 31a of the lower cam element 31 of the output gear 30. The lifter element 28 rests radially inward of the cams 26a, while the lower cams 31a span across the cams 24a of the base portion, the cams 26a of the lower housing 26, and across the lifter element 28 so that they engage the cams 26a and can be received in the receiving portions 28a of the lifter element, as discussed below. That is, the cams 26a of the lower housing 26 are arranged radially about the lower inner surface of the lower housing and the lifter element 28 is disposed radially inward of the cams 26a of the lower housing so that the cams 26a may engage the lower cams 31a of the lower cam element 31 at a position outboard (or around the perimeter edge) of the lifter element 28. For example, the lifter element 28 may rest upon an inner lower surface 26b of the lower housing that is inboard of the cams 26a and circumscribes the opening through the lower housing through which the pivot post and base portion protrude. The lower cams 31a are wide enough to engage the cams 26a of the lower housing 26 and to be received at the receiving portions 28a of the lifter element 28. Cams 24a of the base portion 24 may extend through the open center of the lifter element 28 along the pivot post 22. That is, the lower cam surface of the output gear 30 includes one or more cams 31a that include an inner portion configured to engage the receiving portion 28a of the lifter element 28 and an outer portion radially outboard of the inner portion and configured to engage the upper cam surface 26a of the lower housing 26. The inner portion of the cams 31a may also be configured to engage the cams 24a of the base portion 24. Additionally, the inner portion of the cams 31a may be only partially received in the receiving portions 28a of the lifter element 28 so that the cams 31a may remain engaged with the cams 24a of the base portion 24 when received in the receiving portions 28a.

Optionally, the lifter element 28 may be integrally formed with or fixed relative to the lower housing 26. Because the lifter element 28 is axially movable along the pivot post according to axial movement of the housing, the lifter element 28 may form a non-rotatable portion of the lower inner surface of the lower housing 26. That is, the lifter element 28 may be formed with the inner surface of the lower housing 26 with the rest of the lower housing rotatable about the pivot post 22 relative to the rotationally fixed lifter element 28. Thus, because the lifter element circumscribes the pivot post and is disposed radially inboard of the upper cam surface of the lower housing, the lifter element may form a portion of the lower housing where the lifter element is non-rotatable relative to the base portion, the output gear, and the rest of the housing, and the rest of the housing is rotatable relative to the lifter element. The lifter element is longitudinally or axially movable along the base portion and the pivot post according to longitudinal movement of the housing portion.

Figure 10:
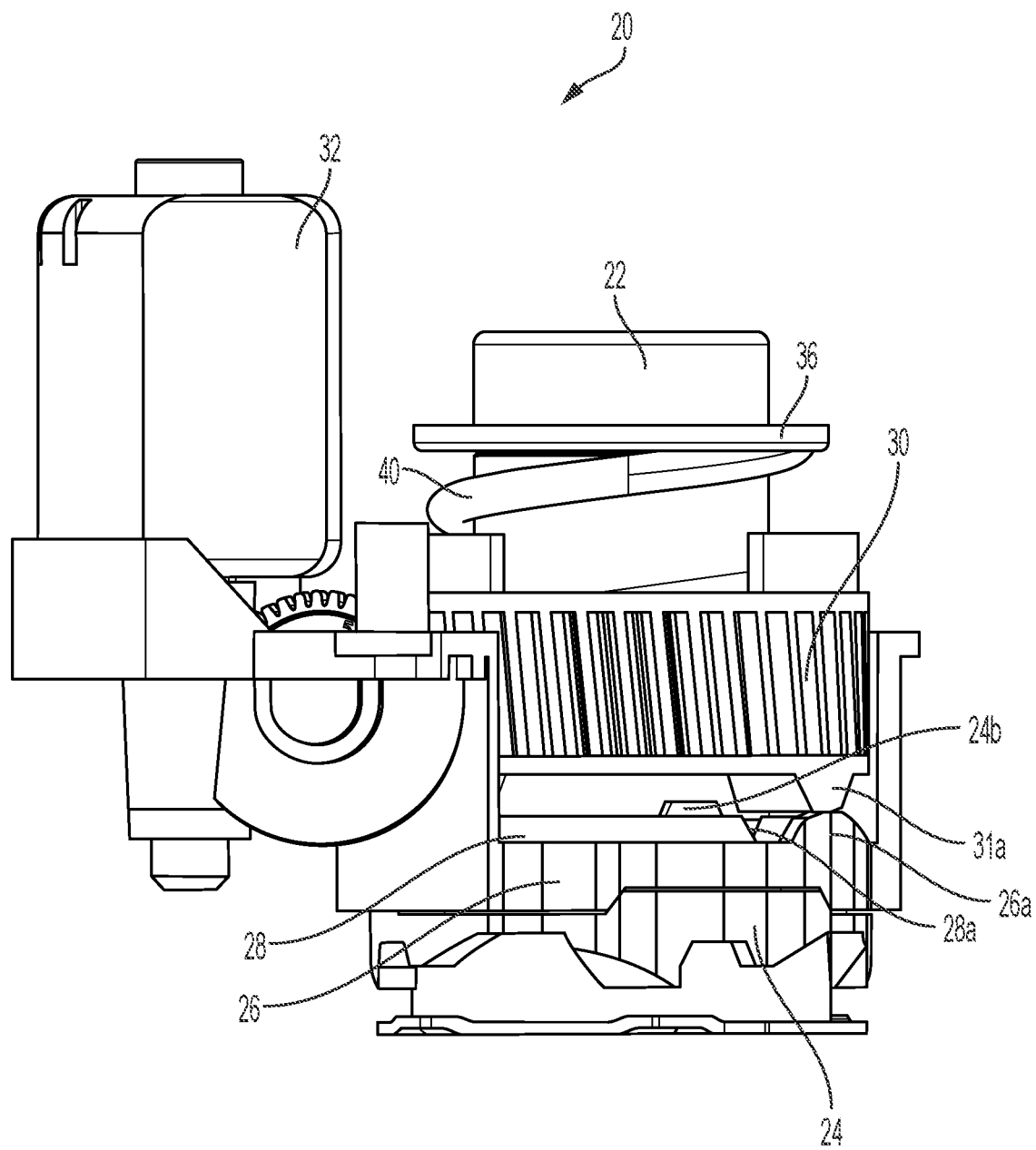
FIGS. 10-12 are views of the actuator when the mirror head of the exterior rearview mirror assembly is in the drive position.
Figure 11:
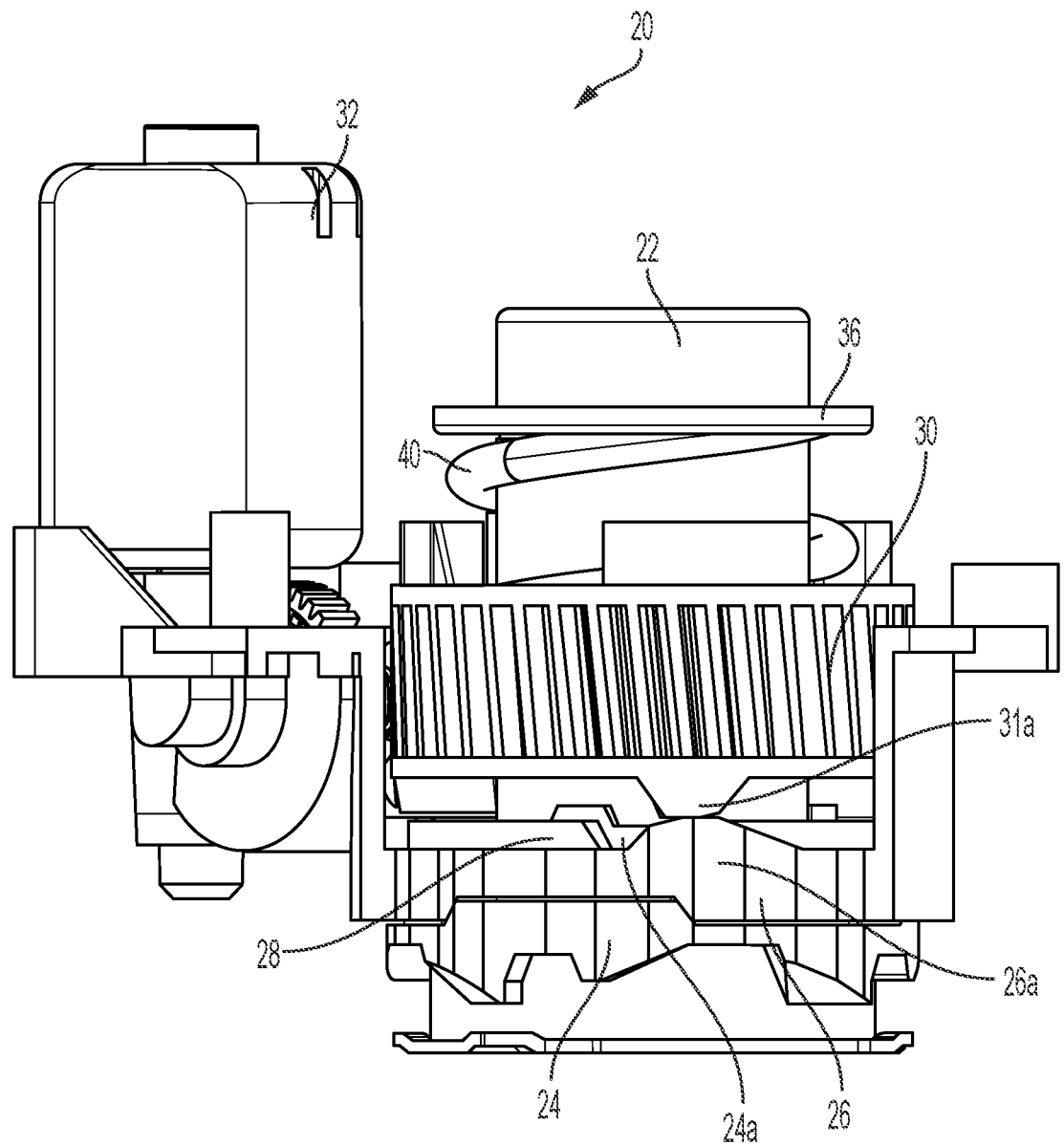
Figure 12:
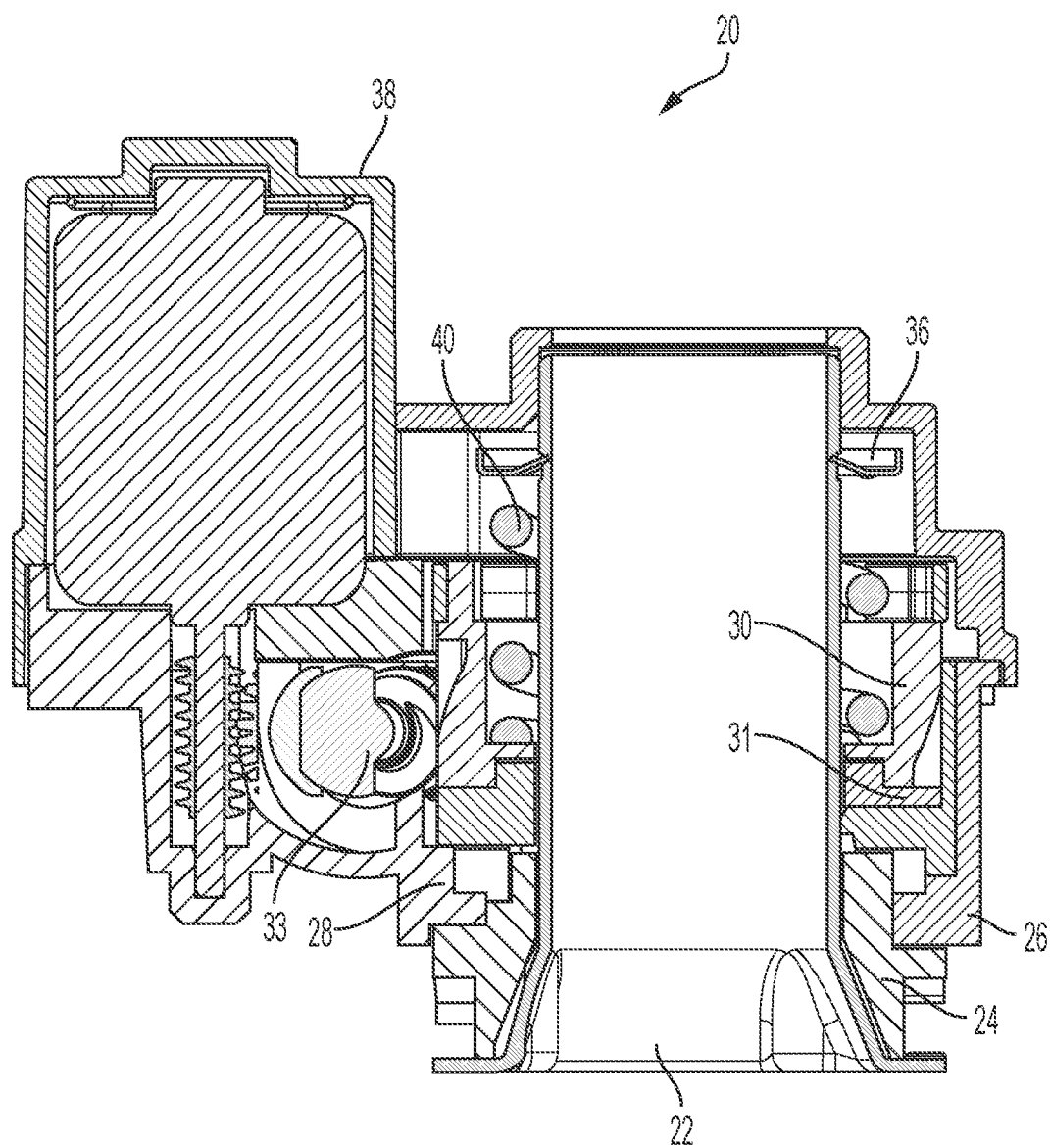
Figure 13:
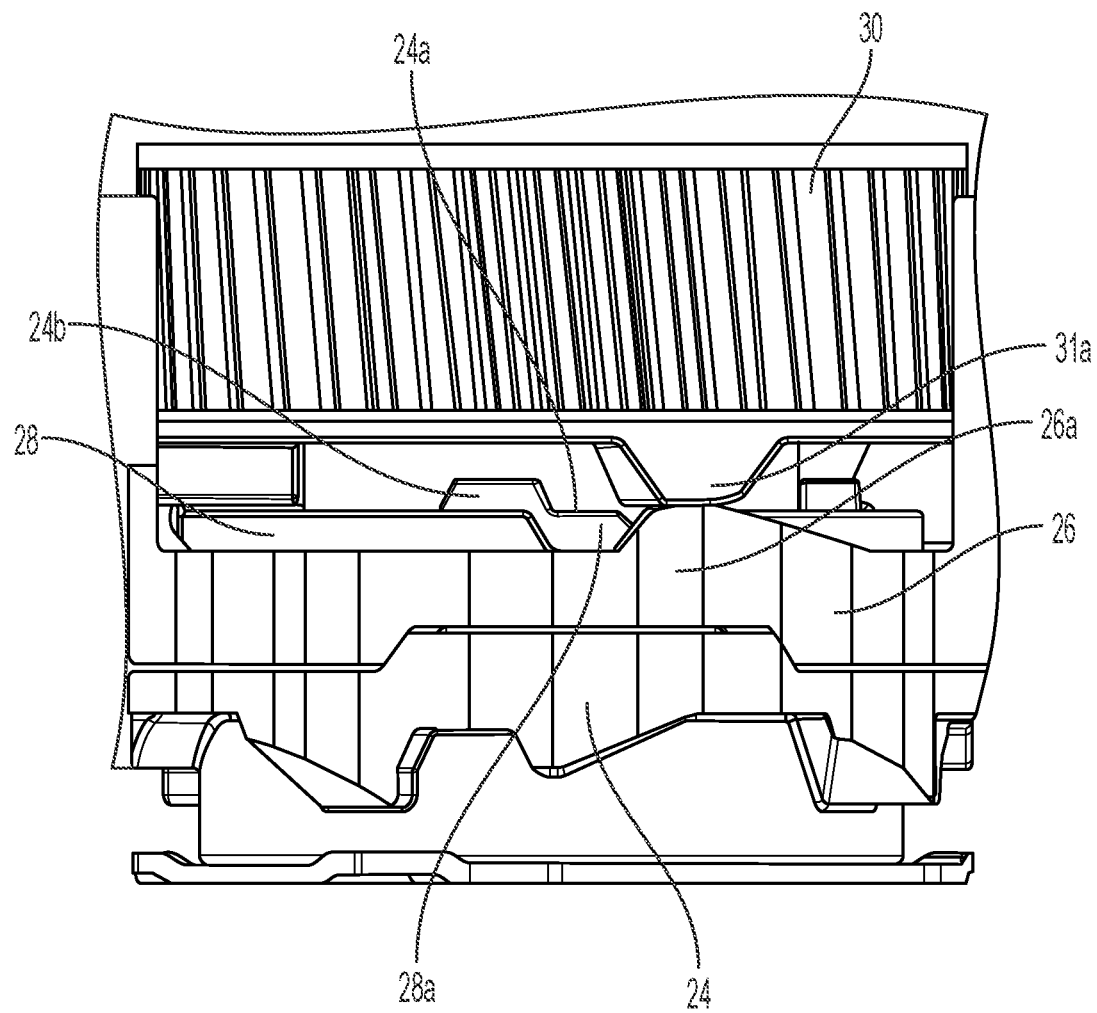
FIG. 13 is an enlarged view of the actuator, showing engagement of the cams of the lower housing portion with the lower cams of the lower cam plate of the output gear when the mirror head of the exterior rearview mirror assembly is in the drive position.

When the mirror head is in the drive position (see FIGS. 10-12), the lower cams 31a engage the cams 26a of the lower housing 26, with a lower surface of the lower housing 26 engaged with or nested on a detent surface of the base portion 24. As can be seen in FIG. 13, the upper cams 26a of the lower housing 26 protrude upward above the upper surface of the lifter 28, so that the lower cams 31a engage the upper cams 26a and not any part of the lifter 28. Thus, when in the drive position, the spring load is through the output gear 30, the lower cam plate 31 and the lower housing 26 to the base 24. The spring load does not pass through the lifter 28, which, with the mirror head in the drive position, rests at or on the lower housing portion and below the lower cams 31a of the output gear and lower cam plate. In other words, with the mirror head at the drive position, the spring element 40 acts on the base 24 via the output gear 30 and the lower housing 26. That is, with the mirror head in the drive position, the lifter element does not engage the output gear and the output gear may rotate relative to the pivot post until the lifter element is raised during powered pivoting of the mirror head and housing and engages the lower cams 31a of the output gear. In other words, with the mirror head at the drive position, a spring load of the spring element (i.e., a force provided by the spring or biasing element acting on one or more components of the actuator) is directed through the output gear ((i.e., acts on the output gear via the engagement of the spring element with the output gear or slip washer at the output gear) and the lower housing (i.e., acts on the lower housing via the engagement of the output gear with the lower cam element and the engagement of the lower cam element with the cams of the lower housing) to the base portion (i.e., acts on the base portion via the engagement of the lower housing with the base portion at the pivot post). Directing the retaining force of the spring element through the housing to the base portion increases stability of the mirror head in the drive position.

Figure 14:
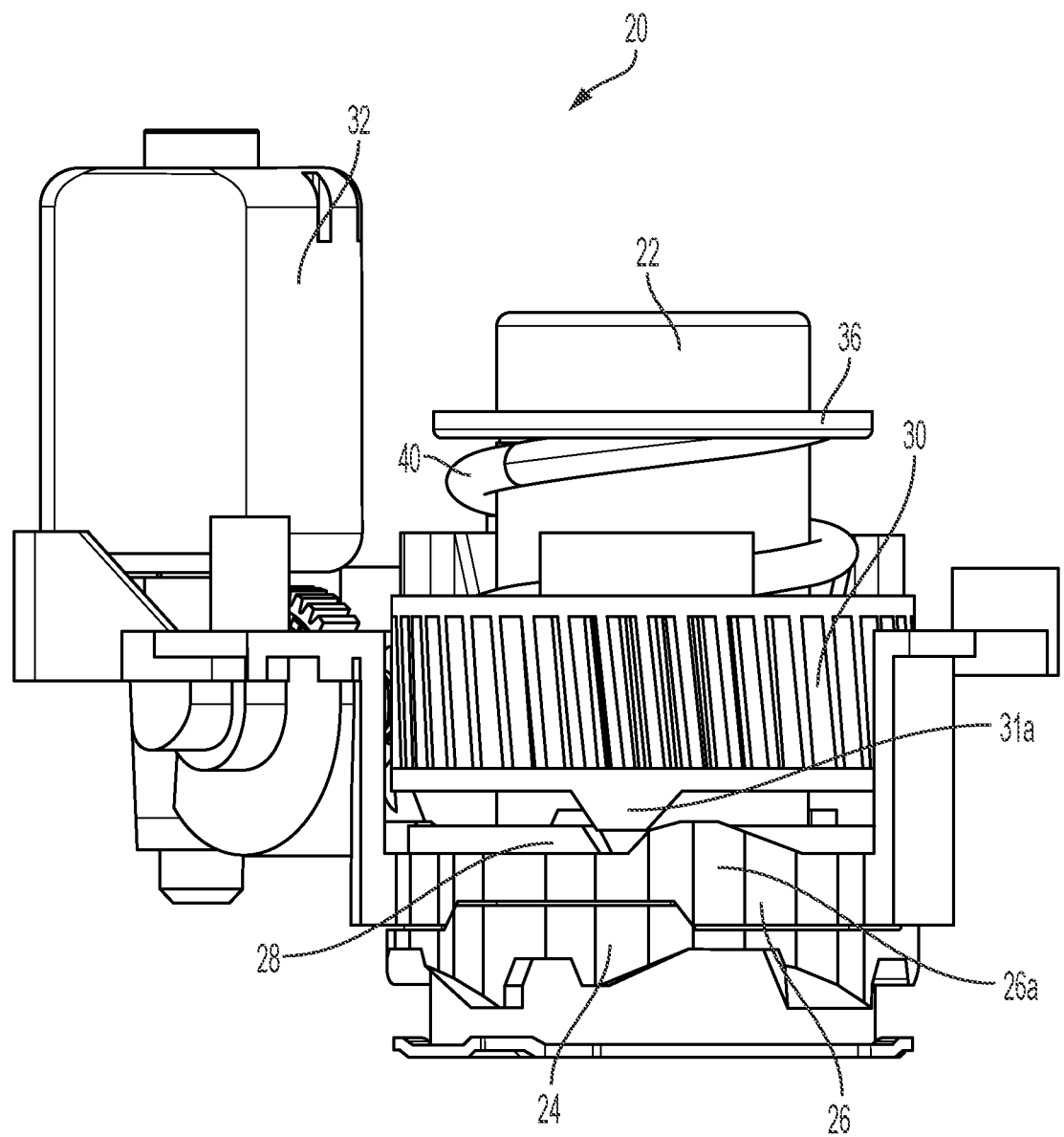
FIGS. 14 and 15 are views of the actuator in a transition phase during powered pivoting of the mirror head.
Figure 15:
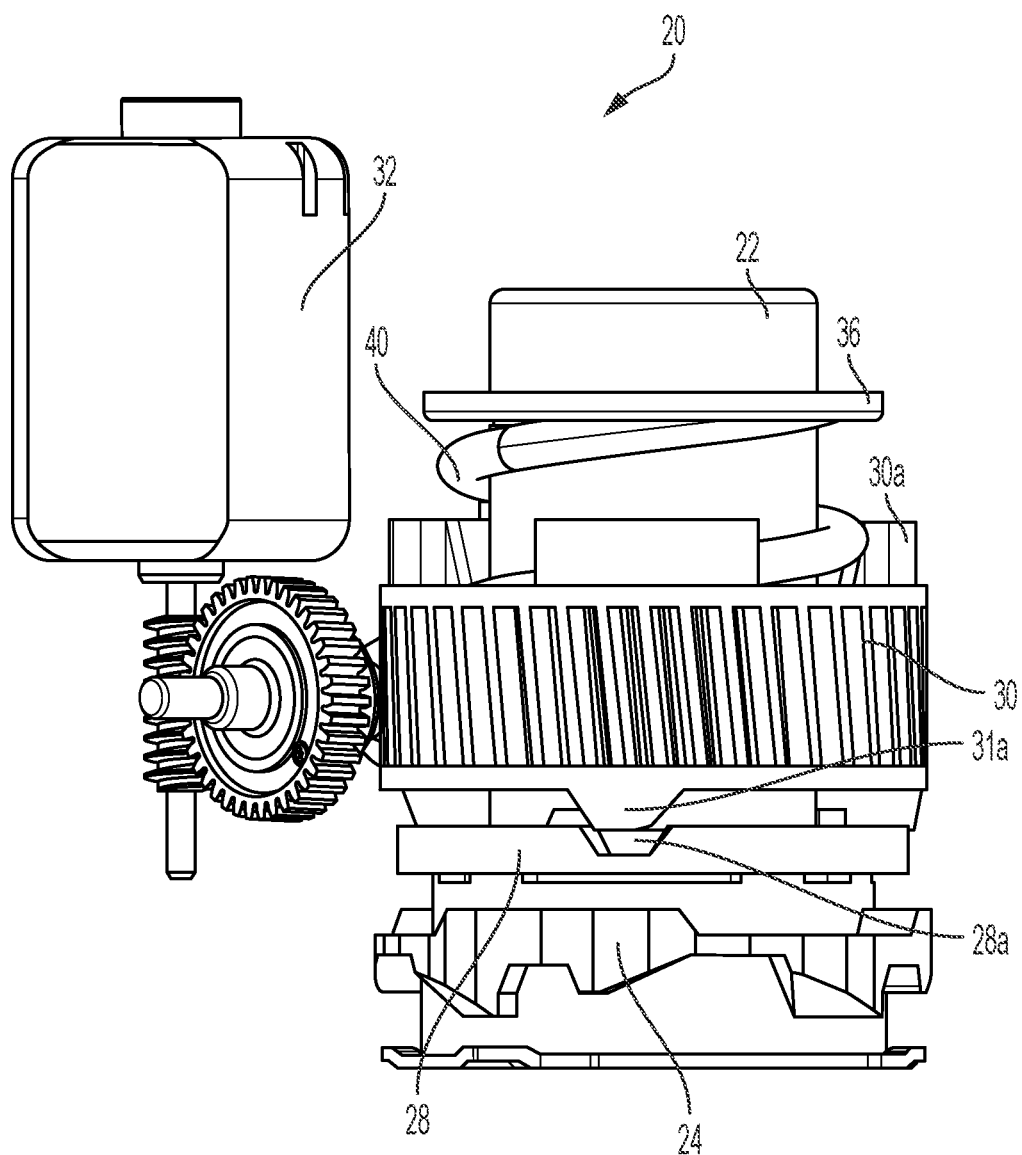

During operation of the actuator, when the motor 32 is first operated to pivot the mirror head from the drive position toward the park position, operation of the motor 32 causes the output gear 30 to rotate to move the lower cams 31a off the upper cams 26a, where they then engage the cams 24a of the base portion 24 (see FIG. 14). That is, initial operation of the motor to move the mirror head from the drive position to the folded position causes the output gear to pivot about the pivot post 22 within the stationary housing until the lower cams 31a of the lower cam element 31 (that is rotationally fixed relative to the output gear 30) engage cams of the base portion 24. As the output gear 30 rotates, the lower cams 31a shift from resting on the cams 26a of the lower housing 26 to moving along the cams 24a of the base portion 24. As can be seen in FIGS. 14 and 15, when the output gear is rotated during this transition period, the lower cams 31a are positioned above the receiving portions 28a of the lifter element 28 and do not engage the lifter element 28. That is, the lower cams 31a are spaced from the cams 26a of the lower housing 26 and the lifter element 28. Thus, during this transition period, the spring force or spring load of the spring element 40 is directed through the output gear directly to the base portion 24, and there is no spring load on the lower housing or the lifter so that the spring element 40 acts on the base portion 24 via the output gear 30 and not via the lower housing or the lifter element. In other words, due to the engagement of the lower cams 31a with the cams 24a of the base portion 24 and the separation of the lower cams 31a from the lifter element 28 while the output gear 30 rotates, the spring load from the spring element 40 is directed through the output gear 30 to the base portion 24. The spring load is not experienced by the lifter element 28 or the lower housing 26 during movement of the output gear 30. That is, when the lower cams 31a at the output gear 30 disengage from the upper cam surface of the lower housing 26 and engage the upper cam surface 24a of the base portion 24, the spring element 40 shifts from acting on the lower housing 26 via the output gear 30 to acting on the base portion 24 via the output gear 30.

Figure 16:
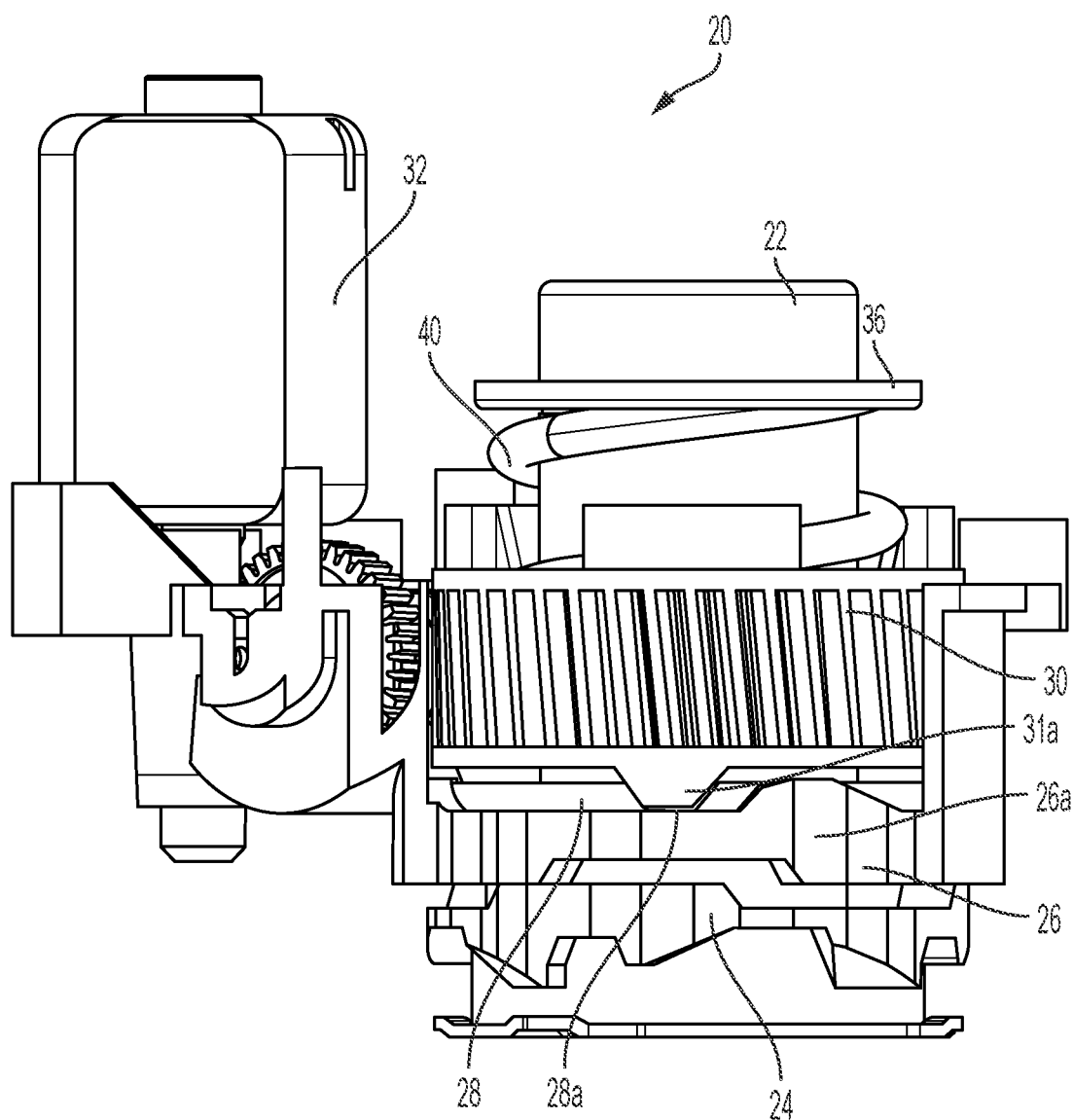
FIG. 16 is a view of the actuator when the mirror head of the exterior rearview mirror assembly is in the park position.

As the motor is further operated, further rotation of the output gear 30 is stopped by engagement of the lower cams 31a with the uppermost cam or protrusion 24b of the base portion 24, and the lower housing portion 26 is rotated relative to the base portion 24. In other words, when the rotation of the output gear 30 is precluded by engagement of the lower cam 31a with the uppermost cam 24b of the base portion 24, the operation of the motor 32 instead causes the housing to pivot or rotate about the output gear 30 and pivot post 22. The main gear 33 travels about the output gear 30. Because there is no spring force on the lower housing 26, the lower housing moves upward out of the detent or drive position and may be guided upward or out of the detent position by the shape of the engagement or detent surface between the lower housing 26 and the base portion 24 (see FIG. 16) as the lower housing 26 rotates relative to the pivot post 22 and base portion 24. The lifter element 28 rests along the inner lower surface of the lower housing 26 and thus lifts along the pivot post 22 with the lower housing 26 as the lower housing rotates relative to the pivot post 22 and base portion 24. The housing and lifter element 28 thus move upward along the pivot post 22 so that the lower cams 31a are received in the receiving portions 28a of the lifter element 28 to limit or preclude rotation of the output gear 30 during the pivoting of the mirror head from the drive position to the park position and then back to the drive position. In other words, where the uppermost protrusion 24b of the base portion 24 precludes movement of the output gear when the mirror head is pivoted from the drive to the folded position, the lifting of the lifter element 28 to engage the lower cams 31a precludes movement of the output gear both when the mirror head is pivoted from the drive to the folded position and when the mirror head is pivoted from the folded position to the drive position. Although the lifter element 28 functions to limit rotation of the output gear relative to the base portion and pivot post, the lifter element does not lift upward at the lower cams 31a, and a small gap exists between the lower end of the lower cams and the lower end or bottom of the receiving portions 28a of the lifter 28 and the lower cams 31a rest upon the cams of the base portion 24 (as can be seen in FIG. 16). During the electrically powered travel of the lower housing 26 about the output gear 30, the spring load path is through the output gear 30 and lower cam plate 31 to the base portion 24. Again, there is no spring load on the lower housing 26 or the lifter element during electrically powered travel. In other words, the spring element does not act on the lower housing or the lifter element during electrically powered travel. The lifter element 28 limits or precludes the output gear 30 from rotating during the electric folding/unfolding of the mirror head. The receiving portions 28a of the lifter element 28 only partially receive the lower cams 31a so that, with the lower cams 31a partially received in the receiving portions 28a of the lifter element 28, the spring element acts on the base portion 24 and not the lifter element 28.

Directing the spring load to non-rotational components of the pivot assembly 21 during rotation of the mirror head reduces the torsional forces felt by the pivot assembly and thus improves the lifespan of the assembly and reduces the chances of the pivot assembly jamming or malfunctioning. Directing the spring load through the housing when the mirror head is in the drive position improves stability of the mirror head in the drive position.

Thus, as the housing and mirror head are rotated toward the folded or park position via operation of the electrically operated motor, the housing lifts in relation to the base while turning, and such lifting lifts the mirror head and increases the gap between the mirror head mounting portion 12a and the mounting arm 18 and thus reduces or limits or avoids pressure at the cut line seal (the seal that is disposed between and at the interface of the mirror head mounting portion 12a and the mounting arm 18 and that follows the contour and fills the gap between the mirror head and the base) during pivotal movement of the mirror head.

Thus, the actuator provides for controlled movement of the mirror head 12 relative to the mounting arm 18, with the spring load directed through the output gear 30 and lower housing portion 26 to the base portion 24 when the mirror head is in the drive position. The mirror head 12 is thus firmly held in place in the drive position due to the spring loads (i.e., the spring element acting on the base portion via the output gear and the lower housing). During pivoting of the mirror head 12 to the park position, the cams work to release the spring load from the housing so that the spring element acts on the base portion via the output gear and does not act on the housing portion or the lifter element so that the housing can lift upward to allow for pivoting of the mirror head with reduced or no contact of the cutline seal, and the lifter element 28 functions to retain the output gear 30 rotationally keyed with the base portion 24, so that the output gear 30 does not rotate relative to the base portion 24 during electrical pivotal movement of the mirror head 12. Throughout the entire range of electrical folding/unfolding of the mirror head 12, the spring load is never through the lifter element 28 and is only through the lower housing portion when the mirror head 12 is in the drive position.

The actuator thus electrically folds rearward from the drive position to the park position and electrically folds forward back to the drive position during normal operation of the motor 32 and without manual pivoting or folding of the mirror head 12. During powered or electric folding from the drive position toward the park position, the output gear 30 rotates to move the lower cams 31a of the lower cam element 31 from engagement with the cams 26a of the lower housing portion 26 to engage the base portion 24, changing or shifting the path or direction of the spring load path from being through the output gear 30 and lower housing 26 to being through the output gear 30 directly to the base 24, allowing the lower housing 26 and lifter element 28 to lift or axially move along the pivot post 22 without spring load. The lower housing rides up the lower detent ramps on the base 24 to provide, for example, 1.5 mm of lift (or other amount of lift depending on the particular application). The lower detent ramps are designed to allow constant surface contact between the lower housing 26 and base 24 while in contact.

Thus, the base portion 24 includes the lower detent ramps which are configured to guide vertical movement of the lower housing 26 (and therefore mirror head) along the pivot post 22 when the mirror head is pivoted between the drive position and the folded position. When the motor 32 is initially powered to pivot the mirror head from the drive position to the folded position and the motor 32 imparts rotational movement of the output gear 30 until the output gear 30 is precluded from further movement by the uppermost protrusion 24b of the base portion 24, rotational movement from operation of the motor 32 is imparted onto the housing, which causes the lower housing 26 to pivot about the output gear 30 and pivot post 22 relative to the base portion 24. As the lower housing 26 pivots relative to the base portion, the engagement of the outer lower surface of the housing with the lower detent ramps of the base portion 24 results in the lower housing 26 following the slope of the lower detent ramps and thus lifting along the pivot post 22 relative to the base portion 24. There is no spring load on the lower housing 26 as it climbs the lower detent ramps under normal electric folding conditions. This is due to the lower cams of the output gear bottoming out on the base 24, which alters the path of the spring load directly to the base 24.

Upon return to the drive position, the lower housing 26 is forced back down the 1.5 mm ramps by a ramp feature of the cams 26a of the lower housing portion engaging the lower cams 31a of the lower cam element 31 at the output gear 30. In other words, the engagement of the lower cams 31a and the cams 26a of the lower housing 26 as the mirror head pivots from the folded position to the drive position guides the engagement of the lower housing 26 with the lower detent ramps of the base portion 24 to guide the housing into a lowered position at the drive position. When the lower housing 26 reengages or settles into engagement with the lower detent ramps of the base portion 24, the lifter element 28 lowers along the pivot post and releases the lower cams 31a of the lower cam element 31. Once the lower housing 26 and lifter element 28 have lowered, further operation of the motor 32 causes the output gear 30 to rotate until the lower cams 31a of the lower cam element 31 at the output gear to ride up onto the cams 26a of the lower housing portion 26, whereby one or more of the protrusions 34a of the resilient element 34 engage the adjacent detent on the inner surface of the upper housing 38, stalling the motor.

Thus, when the motor is cinched, the spring load is transferred through the output gear 30 and through the lower housing 26 to the base 24. During electric folding of the mirror head, the spring load is transferred directly to the base. In other words, the spring load is removed or redirected from the lower housing 26 to allow the lower housing to lift along the pivot post without working against the spring load.

Accordingly, the vehicular exterior rearview mirror assembly includes (i) a mounting arm having a first end configured for attachment at a side of a vehicle and a second end distal from the first end, (ii) a mirror head pivotally mounted at the second end of the mounting arm, with the mirror head including a mirror casing and a reflective element, and (iii) a powerfold actuator. The powerfold actuator includes an electrically operable motor that, when electrically operated, pivots the mirror head relative to the mounting arm between at least the folded position and the drive position. The powerfold actuator includes a pivot assembly that includes a pivot post and a base portion fixed relative to the pivot post and fixed relative to the mounting arm (with the pivot post protruding upward from the distal end region of the mounting arm and establishing a pivot axis for the mirror head). The base portion has a base detent or cam surface (such as a ramped surface that circumscribes the pivot post at the base portion). The powerfold actuator further includes an output gear that circumscribes the pivot post and that has a lower cam surface. The powerfold actuator further includes a housing portion (such as a lower housing portion of a housing of the powerfold actuator) attached at the mirror head that circumscribes the pivot post and has an upper cam surface. The powerfold actuator further includes a lifter element that receives the pivot post therethrough and that has a receiving portion that is configured to (when the lifter element is lifted with the lower housing portion) receive the lower cams of the output gear therein to limit rotation of the output gear about the pivot post. A spring element is disposed between an upper surface of the output gear and an upper end of the pivot post (such as at a radially protruding ring that is received in a groove or channel at least partially around the upper end region of the pivot post or that is welded or otherwise affixed at the upper end region of the pivot post). The spring element exerts a biasing force downward to urge the output gear downward along the pivot post toward the base portion.

The electrically operable motor is disposed at the housing portion and is operable (when the motor is electrically powered or operated) to rotatably drive a gear (such as a worm gear or the like affixed at an output shaft of the motor) that is engaged with the output gear to pivot the housing portion relative to the output gear and the pivot post (to cause the housing portion and the mirror head to move or rotate or pivot about the pivot axis defined by the longitudinal axis of the pivot post). When the mirror head is in the drive position and the lower housing is in a lowered position along the pivot post, operation of the electrically operable motor may impart rotational movement of the output gear within the housing until the rotational movement of the output gear is precluded, such as by engagement of lower cam elements of the lower cam surface of the output gear with cam elements or protrusions of the base portion. With the lower cam elements of the output gear engaged with the cam elements of the base portion, further operation of the motor imparts rotational movement of the housing about the output gear and pivot post. As the mirror head pivots from the drive position to the folded position and as the housing portion pivots about the output gear and pivot post, the housing portion and lifter element lift or axially move along the pivot post according to engagement of the housing portion with a detent surface of the base portion. When the housing portion and lifter element are lifted, the lifter element receives the lower cam elements of the output gear at the receiving portion of the lifter element to preclude rotational movement of the output gear. With the lifter element engaged with the lower cam elements of the output gear, the lower housing pivots about the pivot post and the output gear and lifter element are rotationally fixed or stationary.

With the mirror head at the drive position, the spring load of the spring element is directed through the output gear and the housing portion to the base portion to provide stability to the mirror head in the drive position. During powered pivoting (i.e., operation of the electrically operated motor to pivot the mirror head) of the housing portion relative to the pivot post, the spring load is directly through the output gear to the base portion. During powered pivoting of the housing portion relative to the pivot post, the spring load is not through the housing portion. During powered pivoting of the housing portion relative to the pivot post, the spring load is not through the lifter element. In other words, the spring load is removed or redirected away from the lower housing and the lifter element during powered pivoting of the housing portion. This allows the lower housing and lifter element to lift or axially move along the pivot post without working or lifting against the spring load, reducing the load on the electric motor and the wear on the lower housing and lifting element.

When the mirror head is manually pivoted (such as from the drive position to the park position or such as from the park position to the drive position), the output gear and the housing portion pivot together and in tandem relative to the pivot tube and the base portion. When the mirror head is manually pivoted, the housing portion moves upward relative to the base portion along the surface of the lower detent surface of the base portion, which provides a gap between the mirror head and the mounting arm to reduce or eliminate compression of the cutline seal during such pivoting movement.

The powerfold actuator further comprises a resilient element that circumscribes part of the output gear (such as at an upper part of the output gear). The resilient element has an outwardly radially protruding tab that engages a corresponding inwardly radially protruding tab at the upper housing portion to limit rotation of the housing portion relative to the output gear to stall the motor at stop locations. The output gear and resilient element are formed and arranged so that the resilient element flexes radially inboard to allow movement of the tabs of the resilient element at other locations to avoid stalling the motor at other locations separate from the stop locations.

Figure 19:
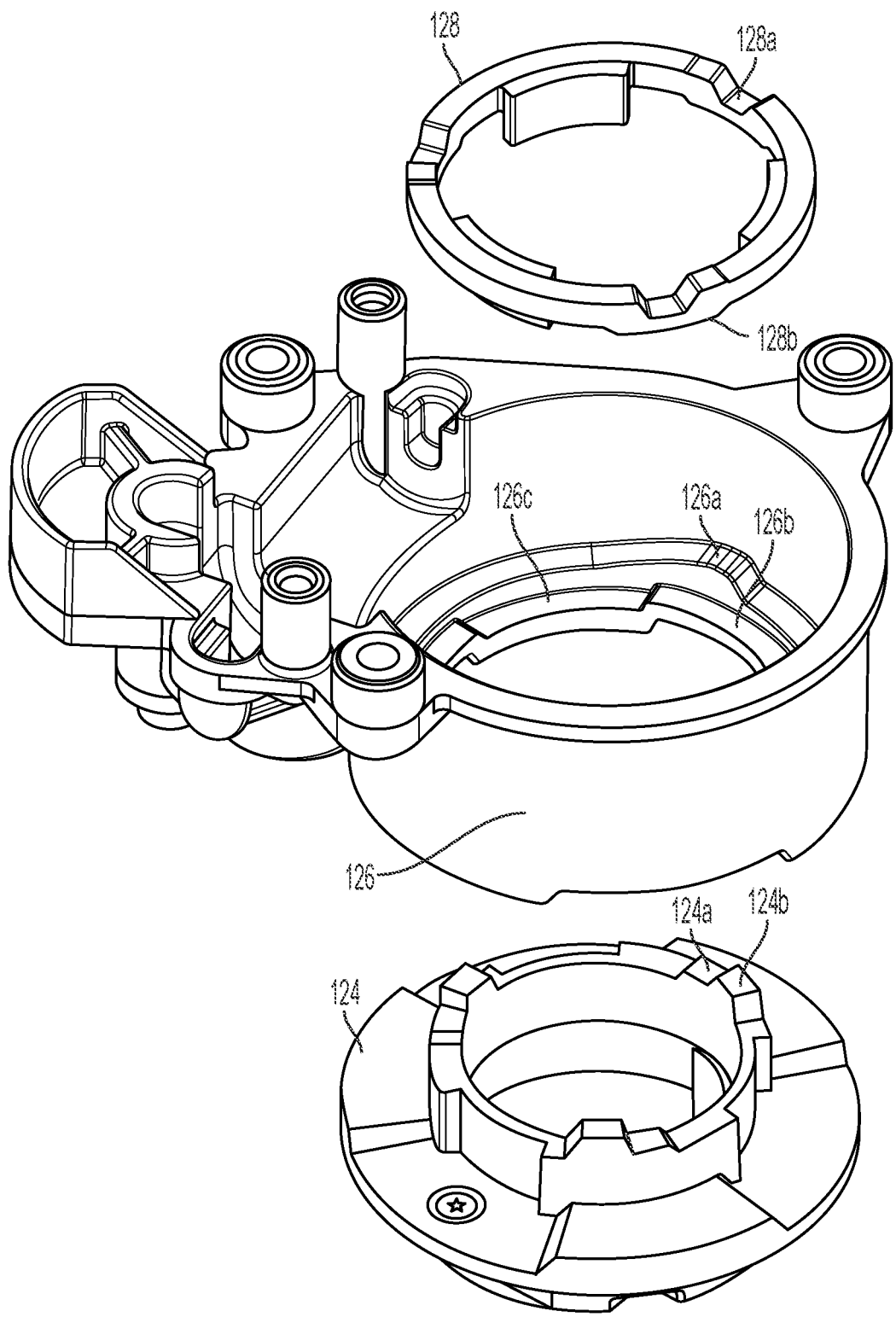
FIG. 19 is a perspective view of a lower housing portion, a lifter element, and a base portion of another actuator.
Figure 20:
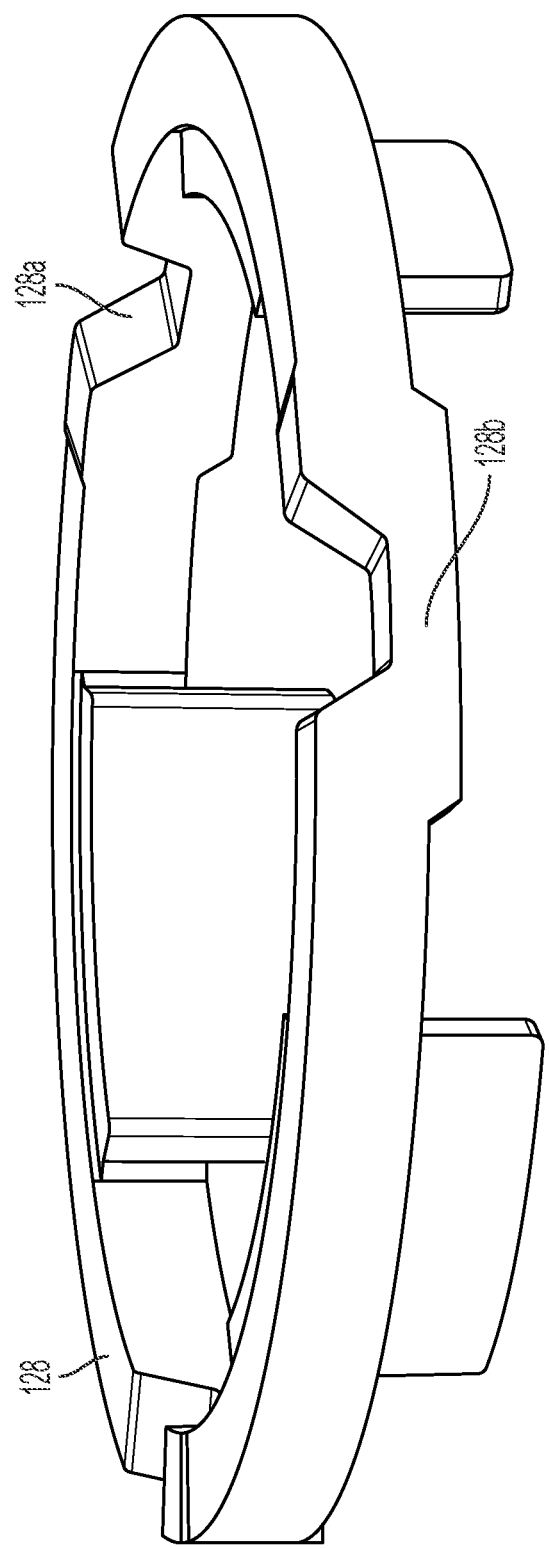
FIG. 20 is a perspective view of the lifter element of FIG. 19.
Figure 21:
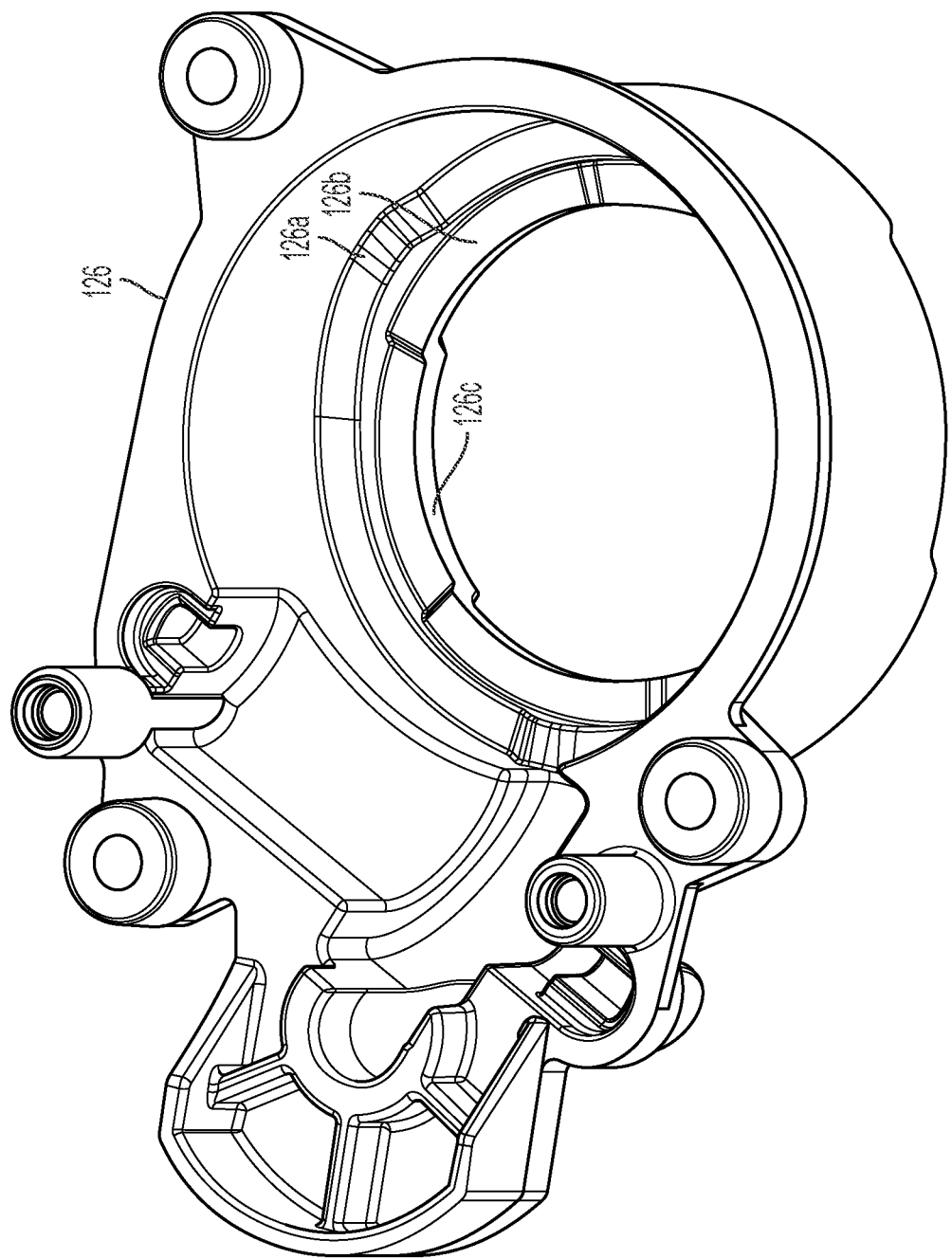
FIG. 21 is a perspective view of the lower housing portion of FIG. 19.

Optionally, an additional detent interface may be formed between the lifter element and the lower inner surface of the lower housing to further reduce wear on the lifter element and other detent surfaces during manual pivoting of the mirror head. As shown in FIGS. 19-21, a powerfold actuator may include a lower housing portion 126 that includes cams 126a and a lower inner surface 126b radially inboard of the cams 126a that is configured to receive the lifter element 128. The lifter element 128 has receiving portions 128a and lower detents or cams 128b protruding from a lower surface of the lifter element 128 and configured to engage corresponding detents 126c at the lower inner surface 126b of the lower housing portion 126. In other words, the lifter element 128 includes the lower cam surface or detents 128b that are configured to interface with corresponding cams or detents 126c of the lower housing 126. The corresponding detents 126c of the lower housing 126 are disposed at the lower inner surface 126b and are radially inboard of the cams 126a. When the lifter element 128 rests on the lower inner surface 126b of the lower housing portion 126, the lifter element 128 is lower within the housing and thus further from engagement of the lower cams of the lower cam element at the output gear. Thus, when the lower cams of the lower cam element engage the cams 124a and the uppermost protrusion 124b of the base portion 124, the lifter element 128 is not engaged by the lower cams and wear on the lifter element is reduced.

That is, additional detents are applied to the lifter element and the lower housing portion. During a situation where the actuator is electrically folded from the drive position to the folded position, then manually folded forward to the drive position, there is a detent on the base portion which may wear or degrade along with the detent on the lifter element. It is the lower cams of the lower cam element at the output gear which cause this wear. To prevent/reduce this wear, additional detents were added so that the lifter is lower during this event. With this change, when the mirror folds from the folded position to the drive position, during this event, the lower cams of the lower cam element at the output gear will pass over the detent of the lifter element without contacting it.

The mirror assembly may utilize aspects of the mirror assemblies described in U.S. Publication Nos. US-2021-0331625; US-2021-0316664; US-2021-0213880; US-2020-0353867 and/or US-2020-0223364, and/or U.S. Pat. Nos. 10,099,618; 9,827,913; 9,487,142; 9,346,403 and/or 8,915,601, which are all hereby incorporated herein by reference in their entireties. The mirror head may be adjustably disposed at the mounting arm, with a portion of the mounting arm or actuator extending through an aperture at the mirror head, whereby operation of the actuator adjusts the mirror head (including the mirror reflective element) relative to the mounting arm to adjust a driver's rearward view and/or to fold (toward the folded or stowed position) or extend (toward the extended or drive or use position) the mirror head relative to the mounting arm and the side of the vehicle. The aperture at the mirror head allows for adjustment or movement of the mirror head relative to the outer end of the mounting arm. In such a configuration, the mirror reflective element may move together and in tandem with the mirror head (which may include a mirror housing or casing or shell that also moves together and in tandem with the mirror reflective element).

The exterior rearview mirror assembly may refer to any suitable exterior rearview mirror assembly having any suitable construction, such as a frameless mirror. A conventional interior (or exterior) rearview mirror assembly uses a plastic bezel that overlaps and encroaches over/onto the planar outermost surface of the frontmost/outermost glass substrate used in the conventional rearview mirror assembly, framing that frontmost/outermost glass substrate in plastic, such as to protect a driver from contact with the sharp outer cut edge of the frontmost/outermost glass substrate. A frameless rearview mirror assembly has no such bezel or frame. For example, Infinity™ and EVO™ interior rearview mirror assemblies are frameless (a.k.a. bezel-less) interior rearview mirror assemblies and use no such bezel or frame.

An Infinity™ electrochromic rearview mirror assembly (Infinity™ is a trademark of Magna Mirrors of America, Inc. of Holland, MI USA) includes a plastic mirror casing or housing formed via a plastic injection molding process [preferably via injection molding of PC/ASA that is an amorphous thermoplastic alloy of polycarbonate (PC) and ASA (acrylic-styrene-acrylate terpolymer) that provides enhanced heat resistance and enhanced mechanical properties]. The electrochromic/electro-optic mirror reflective element comprises a front glass substrate and a rear glass substrate spaced apart from the front glass substrate by a perimeter seal, with an electrochromic medium (that is electrically dimmable) sandwiched between the front glass substrate and the rear glass substrate and bounded by a perimeter seal. The front glass substrate has a planar first glass surface (which is the planar front surface of the mirror reflective element) and a planar second glass surface separated from the planar first glass surface by a thickness dimension of the front glass substrate. The front glass substrate comprises a peripheral surface extending between the planar first glass surface and the planar second glass surface and spanning the thickness dimension of the front glass substrate. When the rearview mirror assembly is mounted at a windshield portion or at a header portion of an equipped vehicle (such as via a mounting structure), the planar first surface faces a driver of the vehicle. A transparent electrically conductive coating is disposed at the planar second glass surface and is in contact with the electro-optic (i.e. the electrochromic) medium. The front glass substrate has a specularly reflective and electrically conductive perimeter band established along a perimeter border region of the planar second surface of the front glass substrate that circumscribes the peripheral border region of the second glass surface of the front glass substrate to render covert the perimeter seal to a driver operating an equipped vehicle who is viewing the rearview mirror assembly when the rearview mirror assembly is mounted at the equipped vehicle. The rear glass substrate has a planar third glass surface and a planar fourth glass surface (which is the planar rear surface of the mirror reflective element), and the planar third glass surface of the rear glass substrate is coated with a visible light-transmitting/visible light reflecting/near-IR light-transmitting (preferably with its principal wavelength centered at 940 nm) multi-layer transflector. The outermost layer of the stack of layers that make up the transflector comprises a transparent electrically conductive coating (preferably comprising indium tin oxide and preferably having a sheet resistance less than 30 ohms per square, with less than 25 ohms/square more preferred and less the 20 ohms/square most preferred) is in contact with the electro-optic (typically electrochromic) medium.

The circumferential outer perimeter of the front glass substrate of the rearview mirror assembly comprises a rounded, curved outer glass surface that provides a rounded transition between the planar first glass surface of the front glass substrate and a less curved outer surface of a side wall of the mirror casing or attachment plate. The circumferential curved outer/rounded glass surface of the front glass substrate has a radius of curvature of at least 2.5 mm and is exposed to, is contactable by and is viewable by the driver of the equipped vehicle when the rearview mirror assembly is mounted at the equipped vehicle. No part of the mirror casing (or of the front plastic bracket/attachment element that the electrochromic/electro-optic mirror reflective element is mounted at) encroaches over/onto the planar first glass surface of the front glass substrate (i.e., the planar front surface of the mirror reflective element). The cross dimensions of the front glass substrate are larger than the cross dimensions of the rear glass substrate so that the front glass substrate extends beyond corresponding edges of the rear glass substrate. The rear glass substrate is received at and is circumscribed by the side wall of the front plastic bracket/attachment element that the electrochromic/electro-optic mirror reflective element is mounted at. The rear glass substrate preferably is attached via double-sided adhesive tape (disposed between the fourth glass surface of the rear glass substrate; i.e., the planar rear surface of the mirror reflective element) to the front plastic bracket/attachment element that the electrochromic/electro-optic mirror reflective element is mounted at.

Thus, in an Infinity™ rearview mirror assembly, the mirror reflective element disposed at the mirror casing (and pivotable with the mirror casing relative to a mounting portion of the assembly) comprises an outermost glass substrate (that is contactable by a driver of a vehicle equipped with an Infinity™ rearview mirror assembly) having a planar front glass surface, a planar rear glass surface and a circumferential perimeter edge around a periphery of the glass substrate that extends across a thickness dimension separating the planar front glass surface from the planar rear glass surface. A front perimeter edge portion of the circumferential perimeter edge comprises a rounded glass surface circumferentially around and circumscribing the periphery of the glass substrate, and the rounded glass surface at least partially spans the thickness dimension of the glass substrate. The rounded glass surface has a radius of curvature of at least 2.5 mm. No portion of the mirror casing overlaps over or onto or encroaches onto the rounded glass surface of the glass substrate. With the mounting portion mounted at the in-cabin side of the windshield of the equipped vehicle, the rounded glass surface of the glass substrate is exposed to and is contactable by the driver of the equipped vehicle. Preferably, the radius of curvature of the rounded glass surface is uniform around the periphery of the glass substrate. The mirror assembly comprises an attachment surface, and preferably, the mirror reflective element is adhered to the attachment surface to secure the mirror reflective element in the mirror assembly.

An interior prismatic rearview mirror assembly (or a non-electrochromic exterior rearview mirror assembly) has a single glass substrate and may similarly have a front perimeter edge portion of a circumferential perimeter edge comprising a rounded glass surface circumferentially around and circumscribing the periphery of the glass substrate, with the rounded glass surface at least partially spanning the thickness dimension of the glass substrate and having a radius of curvature of at least 2.5 mm.

In an EVO™ electrochromic rearview mirror assembly (EVO™ is a trademark of Magna Mirrors of America, Inc. of Holland, MI USA), the electrochromic/electro-optic mirror reflective element comprises a front glass substrate and a rear glass substrate spaced apart from the front glass substrate by a perimeter seal, with an electrochromic medium (that is electrically dimmable) sandwiched between the front glass substrate and the rear glass substrate and bounded by a perimeter seal. The front glass substrate has a planar first glass surface (which is the planar front surface of the mirror reflective element) and a planar second glass surface separated from the planar first glass surface by a thickness dimension of the front glass substrate. The front glass substrate comprises a peripheral surface extending between the planar first glass surface and the planar second glass surface and spanning the thickness dimension of the front glass substrate. When the EVO™ rearview mirror assembly is mounted at a windshield portion or at a header portion of an equipped vehicle (such as via a mounting structure), the planar first glass surface faces a driver of the vehicle. A transparent electrically conductive coating is disposed at the planar second glass surface and is in contact with the electro-optic (i.e. the electrochromic) medium. The front glass substrate has a specularly reflective and electrically conductive perimeter band established along a perimeter border region of the planar second glass surface of the front glass substrate that circumscribes the peripheral border region of the second surface of the front glass substrate to render covert the perimeter seal to a person viewing the rearview mirror assembly when the rearview mirror assembly is mounted at the equipped vehicle. The rear glass substrate has a planar third glass surface and a planar fourth glass surface (which is the planar rear surface of the mirror reflective element), and the planar third glass surface of the rear glass substrate is coated with a visible light-transmitting/visible light reflecting/near-IR light-transmitting (preferably with its principal wavelength centered at 940 nm) multi-layer transflector. The outermost layer of the stack of layers that make up the transflector comprises a transparent electrically conductive coating (preferably comprising indium tin oxide and preferably having a sheet resistance less than 30 ohms per square, with less than 25 ohms/square more preferred and less the 20 ohms/square most preferred) is in contact with the electro-optic medium.

In an EVO™ rearview mirror assembly, a mirror reflective element comprises an outermost glass substrate having a planar first glass surface and a planar second glass surface with a circumferential edge along the periphery of the frontmost/outermost glass substrate. The circumferential edge spans a thickness dimension of the glass substrate between the first and second glass surfaces. The first glass surface of the glass substrate comprises the front or outermost surface of the mirror reflective element that is closest to a driver of a vehicle equipped with the rearview mirror assembly when the rearview mirror assembly is normally mounted at the equipped vehicle. The mirror reflective element comprises a mirror transflector established at a surface of the mirror reflective element other than the first glass surface of the glass substrate. A plastic molding is circumferentially disposed about and circumscribes the circumferential edge of the glass substrate without overlapping onto or encroaching over/onto the first glass surface of the glass substrate. The plastic molding comprises a portion that (a) abuts the circumferential edge of the frontmost/outermost glass substrate and (b) has an outer curved surface that extends from generally adjacent to the first glass surface of the frontmost/outermost glass substrate and that lacks a sharp edge. The plane of the first glass surface of the frontmost/outermost glass substrate is generally flush with the outermost part of the plastic molding. The outer curved surface of the plastic molding provides a curved transition between the plane of the first glass surface of the glass substrate and a plane of a generally less-curved portion of the plastic molding. The generally less-curved portion is rearward of, adjacent to and contiguous with the outer curved surface of the plastic molding. The plastic molding comprises at least a portion of a mirror housing of the rearview mirror assembly. When the mirror reflective element is moved to set a field of view to a desired setting of a driver of the equipped vehicle, the mirror housing moves in tandem with the mirror reflective element. The plastic molding comprises a pocket and the mirror reflective element is received in the pocket, and at least a portion of the plastic molding is rearward of the glass substrate when the mirror reflective element is received in the pocket. The plastic molding comprises structure for attaching a rear mirror casing cap portion thereat. The rear mirror casing cap portion is configured for attachment at the structure of the plastic molding.

Thus, in an EVO™ rearview mirror assembly, the mirror reflective element nests into an attachment element or plastic molding or bracket that the electrochromic/electro-optic mirror reflective element nest into/is support by. The rear glass substrate preferably is attached via double-sided adhesive tape (disposed between the fourth glass surface of the rear glass substrate; i.e., the planar rear surface of the mirror reflective element) to the front plastic bracket/attachment element that the electrochromic/electro-optic mirror reflective element is mounted at. A circumferential wall structure extends from the mirror-element attachment side of the attachment element or plastic molding or bracket. The circumferential wall structure spans the rear glass substrate, spans the electrochromic medium and spans the thickness dimension of the front glass substrate. However, the circumferential wall structure does not overlap and does not encroach over/onto the planar first (front) glass surface of the front glass substrate (i.e., the planar front surface of the mirror reflective element). The circumferential wall structure prevents, with the mirror assembly in use in an equipped vehicle, contact by the driver with any of the cut edges of the front and rear glass substrates and especially protects against contact with the circumferential outer cut edge of the front glass substrate.

An interior prismatic EVO™ rearview mirror assembly (or a non-electrochromic exterior EVO™ rearview mirror assembly) has a single glass substrate (an exterior EVO™ rearview mirror assembly may have a planar glass substrate, such as for a driver side mirror with unit magnification or a bent/curved glass substrate, such as for a passenger side mirror with wider rearward view) and may similarly have a circumferential wall structure that extends from the mirror-element attachment side of the attachment element or plastic molding or bracket. The circumferential wall structure spans the glass substrate and spans the thickness dimension of the glass substrate. However, the circumferential wall structure does not overlap and does not encroach over/onto the planar first (front) glass surface of the glass substrate (i.e., the planar front surface of the mirror reflective element).

The mirror assembly may comprise any suitable construction, such as, for example, a mirror assembly with the reflective element being nested in the mirror casing and with the mirror casing having a curved or rounded perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, which are hereby incorporated herein by reference in their entireties), or such as a mirror assembly having a rear substrate of an electro-optic or electrochromic reflective element nested in the mirror casing, and with the front substrate having curved or rounded perimeter edges, or such as a mirror assembly having a single glass substrate reflective element that is disposed at an outer perimeter edge of the mirror casing and with the glass substrate having curved or rounded perimeter edges, or such as a mirror assembly having a reflective element glass substrate that is circumscribed by a perimeter wall of an attachment plate, with no part of the perimeter wall of the attachment plate encroaching or overlapping onto the outermost surface of the glass substrate, such as by utilizing aspects of the mirror assemblies described in U.S. Pat. Nos. 10,099,618; 9,827,913; 9,598,016; 9,346,403; 9,174,578; 8,915,601; 8,730,553 and/or 8,508,831, which are hereby incorporated herein by reference in their entireties (and with electrochromic and prismatic mirrors of such construction are commercially available from the assignee of this application under the trade name INFINITY™ mirror). In such applications, the mirror reflective element may be adhesively attached at a bracket or attachment plate of the mirror head and may move together and in tandem with the mirror head relative to the mounting arm. The mirror assembly may include an actuator at the mounting arm or mirror head that operates to pivot or adjust the mirror head (and reflective element) relative to the mounting arm and the side of the vehicle at which the mounting arm is attached, such as by utilizing aspects of the mirror assemblies described in U.S. Publication Nos. US-2021-0331625; US-2021-0316664; US-2021-0213880 and/or US-2020-0353867, and/or U.S. Pat. Nos. 11,173,843; 10,099,618; 9,827,913; 9,487,142; 9,346,403; 9,067,541; 8,915,601; 8,764,256; 7,887,202; 7,722,199; 7,314,285; 7,267,449; 7,159,992; 7,104,663; 7,093,946; 7,090,363; 7,080,914; 7,073,914; 6,916,100; 6,755,544; 6,698,905; 6,685,864; 6,467,920; 6,362,548; 6,312,135; 6,243,218; 6,229,226; 6,213,612; 5,986,364; 5,900,999 and/or 5,703,731, which are all hereby incorporated herein by reference in their entireties.

Therefore, the vehicular exterior rearview mirror assembly comprises (i) a mounting arm having a first end configured for attachment at a side of a vehicle and a second end distal from the first end, (ii) a mirror head disposed at the second end of the mounting arm, wherein the mirror head comprises a mirror reflective element, and (iii) a powerfold actuator, wherein the powerfold actuator comprises an electrically-operable motor. The powerfold actuator, when the electrically-operable motor is electrically operated, pivots the mirror head relative to the mounting arm between at least (i) a drive position where the mirror head is extended outward relative to the side of the equipped vehicle and (ii) a folded position where the mirror head is folded toward the side of the equipped vehicle. The powerfold actuator comprises (i) a pivot post, the pivot post comprising a first end and a second end distal from the first end, (ii) a base portion fixed relative to the first end of the pivot post and fixed relative to the mounting arm, (iii) a first gear, (iv) a housing portion attached at the mirror head, (v) a lifter element non-rotatably disposed at the pivot post and (vi) a spring element disposed between the first gear and the second end of the pivot post, the spring element urging the first gear toward the base portion. The electrically-operable motor, when electrically-operated, rotatably drives a second gear that is engaged with the first gear to pivot the housing portion relative to the first gear and the pivot post. With the mirror head at the drive position, the lifter element does not engage the first gear. During powered pivoting of the housing portion relative to the pivot post, the lifter element engages the first gear to limit rotation of the first gear relative to the pivot post. With the mirror head at the drive position, the spring element acts on the base portion via the first gear and the housing portion. During powered pivoting of the housing portion relative to the pivot post, the spring element acts on the base portion via the first gear and not via the housing portion or the lifter element.

Optionally, with the mirror head at the drive position, a lower cam surface of the first gear engages an upper cam surface of the housing portion. With the mirror head at the drive position, a lower surface of the housing portion may be nested with a detent surface of the base portion. When the powerfold actuator operates to pivot the mirror head from the drive position toward the folded position, the first gear rotates relative to the pivot post and the lower cam surface of the first gear may disengage from the upper cam surface of the housing portion and engage an upper cam surface of the base portion. When the first gear disengages from the upper cam surface of the housing portion and engages the upper cam surface of the base portion, the spring element shifts from acting on the housing portion via the first gear to acting on the base portion via the first gear. As the first gear rotates relative to the pivot post, the lower cam surface of the first gear travels along the upper cam surface of the base portion. As the first gear rotates relative to the pivot post and the lower cam surface of the first gear travels along the upper cam surface of the base portion, the lower cam surface of the first gear is spaced from the upper cam surface of the lower housing and the lifter element. As the lower cam surface of the first gear travels along the upper cam surface of the base portion, rotation of the first gear relative to the pivot post is stopped when the lower cam surface of the first gear engages an uppermost protrusion of the upper cam surface of the base portion. Rotation of the first gear relative to the pivot post may be stopped by a cam of the upper cam surface of the base portion. With rotation of the first gear stopped, further operation of the electrically-operable motor rotates the housing portion relative to the pivot post and the base portion and the housing portion and lifter element rise upward toward the first gear as the housing portion rotates relative to the pivot post and the base portion. As the housing portion rotates relative to the pivot post and the base portion and the housing portion and lifter element rise upward toward the first gear, the spring element acts on the base portion via the first gear and not via the housing portion or the lifter element. The housing portion may be guided upward along the pivot post as the housing portion rotates relative to the pivot post and base portion as the lower surface of the housing portion travels along the detent surface of the base portion. As the housing portion and lifter element rise upward toward the first gear, a receiving portion of the lifter element at least partially receives lower cams of the lower cam surface of the first gear to limit rotation of the first gear relative to the lifter element and the pivot post. With the lower cams of the lower cam surface at least partially received in the receiving portion of the lifter element, a first portion of each of the lower cams is received in the receiving portion and a second portion of each of the lower cams engages the upper cam surface of the base portion. The receiving portion of the lifter element only partially receives the lower cams of the lower cam surface so that, with the lower cams of the lower cam surface of the first gear partially received in the receiving portion of the lifter element, the spring element acts on the base portion and not the lifter element.

Optionally, as the mirror head moves from the drive position toward the folded position, the housing portion may move upward relative to the base portion to raise the mirror head relative to the mounting arm. As the housing portion moves upward relative to the base portion, the lifter element moves into engagement with the first gear to limit rotation of the first gear relative to the pivot post.

Optionally, during manual pivoting of the housing portion relative to the pivot post, the first gear and the housing portion may pivot together and in tandem relative to the pivot post.

Optionally, during manual pivoting of the housing portion relative to the pivot post, the housing portion may move upward relative to the base portion as a lower surface of the housing portion travels along a detent surface of the base portion.

Optionally, the powerfold actuator may comprise a resilient element at an upper end of the first gear that has a radially protruding tab that engages a corresponding tab at the housing portion to limit rotation of the housing portion relative to the first gear to stall the electrically-operable motor at stop locations. The resilient element flexes radially inboard to allow movement of the radially protruding tab of the resilient element to avoid stalling the electrically-operable motor at other locations separate from the stop locations.

Optionally, the lifter element may be longitudinally movable along the base portion and the pivot post.

Optionally, the lifter element circumscribes the pivot post and is disposed radially inboard of an upper cam surface of the housing portion. The lifter element may comprise a portion of the housing portion. The housing portion may be rotatable relative to the lifter element, and the lifter element may be longitudinally movable along the base portion and the pivot post so as to move longitudinally with the housing portion. A lower cam surface of the first gear may include one or more cams disposed radially about a lower cam surface of the first gear. Each cam of the one or more cams of the lower cam surface of the first gear includes (i) an inner portion configured to engage a receiving portion of the lifter element and (ii) an outer portion radially outboard of the inner portion and configured to engage an upper cam surface of the housing portion. The inner portion of the one or more cams of the lower cam surface of the first gear is further configured to engage a base cam surface of the base portion.

Optionally, the lifter element may comprise a lower cam surface configured to interface with a corresponding cam surface of the housing portion. The corresponding cam surface of the housing portion is disposed at an inner surface of the housing portion and radially inboard of an upper cam surface of the housing portion.

Optionally, the mirror head may be pivotally mounted at the second end of the mounting arm.

Optionally, with the mirror head at the drive position, a spring load of the spring element is through the first gear and housing portion to the base portion. During powered pivoting of the housing portion relative to the pivot post, the spring load is through the first gear directly to the base portion. During powered pivoting of the housing portion relative to the pivot post, the spring load is not through the housing portion. During powered pivoting of the housing portion relative to the pivot post, the spring load is not through the lifter element.

Optionally, the mirror head comprises a frameless mirror reflective element. The frameless mirror reflective element comprises a glass substrate having a first glass surface and a second glass surface with a circumferential edge along the periphery of the glass substrate that spans a thickness dimension of the glass substrate between the first and second glass surfaces, and wherein the planar first glass surface of the glass substrate is closest to a driver of a vehicle equipped with the vehicular exterior rearview mirror assembly when the vehicular exterior rearview mirror assembly is normally mounted at the equipped vehicle, and wherein the frameless mirror reflective element comprises a mirror reflector established at a surface of the frameless mirror reflective element other than the first glass surface of the glass substrate. The mirror head comprises a plastic molding that is circumferentially disposed about and circumscribes the circumferential edge of the glass substrate without overlapping onto or encroaching onto the first glass surface of the glass substrate. The plastic molding may be part of an attachment plate attached at a rear side of the frameless mirror reflective element opposite the first glass surface of the glass substrate. The plastic molding comprises an outer curved surface that extends from adjacent to the first glass surface of the glass substrate and provides a curved transition between the plane of the first glass surface of the glass substrate and a plane of a less-curved portion of the plastic molding.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:

a mounting arm having a first end configured for attachment at a side of an equipped vehicle and a second end distal from the first end;

a mirror head disposed at the second end of the mounting arm, wherein the mirror head comprises a mirror reflective element;

a powerfold actuator, wherein the powerfold actuator comprises an electrically-operable motor;

wherein the powerfold actuator, when the electrically-operable motor is electrically operated, pivots the mirror head relative to the mounting arm between at least (i) a drive position where the mirror head is extended outward relative to the side of the equipped vehicle and (ii) a folded position where the mirror head is folded toward the side of the equipped vehicle;

wherein the powerfold actuator comprises (i) a pivot post, the pivot post comprising a first end and a second end distal from the first end, (ii) a base portion fixed relative to the first end of the pivot post and fixed relative to the mounting arm, (iii) a first gear, (iv) a housing portion attached at the mirror head, (v) a lifter element non-rotatably disposed at the pivot post and (vi) a spring element disposed between the first gear and the second end of the pivot post, the spring element urging the first gear toward the base portion;

wherein the electrically-operable motor, when electrically-operated, rotatably drives a second gear that is engaged with the first gear to pivot the housing portion relative to the first gear and the pivot post;

wherein, with the mirror head at the drive position, the lifter element does not engage the first gear;

wherein, during powered pivoting of the housing portion relative to the pivot post, the lifter element engages the first gear to limit rotation of the first gear relative to the pivot post;

wherein, with the mirror head at the drive position, the spring element acts on the base portion via the first gear and the housing portion; and wherein, during powered pivoting of the housing portion relative to the pivot post, the spring element acts on the base portion via the first gear and not via the housing portion or the lifter element.

2. The vehicular exterior rearview mirror assembly of claim 1, wherein, with the mirror head at the drive position, a lower cam surface of the first gear engages an upper cam surface of the housing portion.

3. The vehicular exterior rearview mirror assembly of claim 2, wherein, with the mirror head at the drive position, a lower surface of the housing portion is nested with a detent surface of the base portion.

4. The vehicular exterior rearview mirror assembly of claim 3, wherein, when the powerfold actuator operates to pivot the mirror head from the drive position toward the folded position, the first gear rotates relative to the pivot post and the lower cam surface of the first gear disengages from the upper cam surface of the housing portion and engages an upper cam surface of the base portion.

5. The vehicular exterior rearview mirror assembly of claim 4, wherein, when the first gear disengages from the upper cam surface of the housing portion and engages the upper cam surface of the base portion, the spring element shifts from acting on the housing portion via the first gear to acting on the base portion via the first gear.

6. The vehicular exterior rearview mirror assembly of claim 5, wherein, as the first gear rotates relative to the pivot post, the lower cam surface of the first gear travels along the upper cam surface of the base portion.

7. The vehicular exterior rearview mirror assembly of claim 6, wherein, as the first gear rotates relative to the pivot post and the lower cam surface of the first gear travels along the upper cam surface of the base portion, the lower cam surface of the first gear is spaced from the upper cam surface of the lower housing and the lifter element.

8. The vehicular exterior rearview mirror assembly of claim 4, wherein, as the lower cam surface of the first gear travels along the upper cam surface of the base portion, rotation of the first gear relative to the pivot post is stopped when the lower cam surface of the first gear engages an uppermost protrusion of the upper cam surface of the base portion.

9. The vehicular exterior rearview mirror assembly of claim 4, wherein rotation of the first gear relative to the pivot post is stopped by a cam of the upper cam surface of the base portion.

10. The vehicular exterior rearview mirror assembly of claim 9, wherein, with rotation of the first gear stopped, further operation of the electrically-operable motor rotates the housing portion relative to the pivot post and the base portion and the housing portion and the lifter element rise upward toward the first gear as the housing portion rotates relative to the pivot post and the base portion.

11. The vehicular exterior rearview mirror assembly of claim 10, wherein, as the housing portion rotates relative to the pivot post and the base portion and the housing portion and the lifter element rise upward toward the first gear, the spring element acts on the base portion via the first gear and not via the housing portion or the lifter element.

12. The vehicular exterior rearview mirror assembly of claim 10, wherein, the housing portion is guided upward along the pivot post as the housing portion rotates relative to the pivot post and base portion as the lower surface of the housing portion travels along the detent surface of the base portion.

13. The vehicular exterior rearview mirror assembly of claim 10, wherein, as the housing portion and the lifter element rise upward toward the first gear, a receiving portion of the lifter element at least partially receives lower cams of the lower cam surface of the first gear to limit rotation of the first gear relative to the lifter element and the pivot post.

14. The vehicular exterior rearview mirror assembly of claim 13, wherein, with the lower cams of the lower cam surface at least partially received in the receiving portion of the lifter element, a first portion of each of the lower cams is received in the receiving portion and a second portion of each of the lower cams engages the upper cam surface of the base portion.

15. The vehicular exterior rearview mirror assembly of claim 13, wherein the receiving portion of the lifter element only partially receives the lower cams of the lower cam surface so that, with the lower cams of the lower cam surface of the first gear partially received in the receiving portion of the lifter element, the spring element acts on the base portion and not the lifter element.

16. The vehicular exterior rearview mirror assembly of claim 1, wherein, as the mirror head moves from the drive position toward the folded position, the housing portion moves upward relative to the base portion to raise the mirror head relative to the mounting arm.

17. The vehicular exterior rearview mirror assembly of claim 16, wherein, as the housing portion moves upward relative to the base portion, the lifter element moves into engagement with the first gear to limit rotation of the first gear relative to the pivot post.

18. The vehicular exterior rearview mirror assembly of claim 1, wherein, during manual pivoting of the housing portion relative to the pivot post, the first gear and the housing portion pivot together and in tandem relative to the pivot post.

19. The vehicular exterior rearview mirror assembly of claim 1, wherein, during manual pivoting of the housing portion relative to the pivot post, the housing portion moves upward relative to the base portion as a lower surface of the housing portion travels along a detent surface of the base portion.

20. The vehicular exterior rearview mirror assembly of claim 1, wherein the powerfold actuator comprises a resilient element at an upper end of the first gear that has a radially protruding tab that engages a corresponding tab at the housing portion to limit rotation of the housing portion relative to the first gear to stall the electrically-operable motor at stop locations.

21. The vehicular exterior rearview mirror assembly of claim 20, wherein the resilient element flexes radially inboard to allow movement of the radially protruding tab of the resilient element to avoid stalling the electrically-operable motor at other locations separate from the stop locations.

22. The vehicular exterior rearview mirror assembly of claim 1, wherein the lifter element is longitudinally movable along the base portion and the pivot post.

23. The vehicular exterior rearview mirror assembly of claim 1, wherein the lifter element circumscribes the pivot post and is disposed radially inboard of an upper cam surface of the housing portion.

24. The vehicular exterior rearview mirror assembly of claim 23, wherein the lifter element comprises a portion of the housing portion.

25. The vehicular exterior rearview mirror assembly of claim 23, wherein the housing portion is rotatable relative to the lifter element.

26. The vehicular exterior rearview mirror assembly of claim 25, wherein the lifter element is longitudinally movable along the base portion and the pivot post and moves longitudinally with the housing portion.

27. The vehicular exterior rearview mirror assembly of claim 23, wherein a lower cam surface of the first gear includes one or more cams disposed radially about a lower cam surface of the first gear.

28. The vehicular exterior rearview mirror assembly of claim 27, wherein each cam of the one or more cams of the lower cam surface of the first gear includes (i) an inner portion configured to engage a receiving portion of the lifter element and (ii) an outer portion radially outboard of the inner portion and configured to engage an upper cam surface of the housing portion.

29. The vehicular exterior rearview mirror assembly of claim 28, wherein the inner portion of the one or more cams of the lower cam surface of the first gear is further configured to engage a base cam surface of the base portion.

30. The vehicular exterior rearview mirror assembly of claim 1, wherein the lifter element comprises a lower cam surface configured to interface with a corresponding cam surface of the housing portion.

31. The vehicular exterior rearview mirror assembly of claim 30, wherein the corresponding cam surface of the housing portion is disposed at an inner surface of the housing portion and radially inboard of an upper cam surface of the housing portion.

32. The vehicular exterior rearview mirror assembly of claim 1, wherein the mirror head is pivotally mounted at the second end of the mounting arm.

33. The vehicular exterior rearview mirror assembly of claim 1, wherein, with the mirror head at the drive position, a spring load of the spring element is through the first gear and housing portion to the base portion.

34. The vehicular exterior rearview mirror assembly of claim 33, wherein, during powered pivoting of the housing portion relative to the pivot post, the spring load is through the first gear directly to the base portion.

35. The vehicular exterior rearview mirror assembly of claim 34, wherein, during powered pivoting of the housing portion relative to the pivot post, the spring load is not through the housing portion.

36. The vehicular exterior rearview mirror assembly of claim 35, wherein, during powered pivoting of the housing portion relative to the pivot post, the spring load is not through the lifter element.

37. The vehicular exterior rearview mirror assembly of claim 1, wherein the mirror head comprises a frameless mirror reflective element.

38. The vehicular exterior rearview mirror assembly of claim 37, wherein the frameless mirror reflective element comprises a glass substrate having a first glass surface and a second glass surface with a circumferential edge along the periphery of the glass substrate that spans a thickness dimension of the glass substrate between the first and second glass surfaces, and wherein the planar first glass surface of the glass substrate is closest to a driver of the equipped vehicle with the vehicular exterior rearview mirror assembly when the vehicular exterior rearview mirror assembly is normally mounted at the equipped vehicle, and wherein the frameless mirror reflective element comprises a mirror reflector established at a surface of the frameless mirror reflective element other than the first glass surface of the glass substrate.

39. The vehicular exterior rearview mirror assembly of claim 38, wherein the mirror head comprises a plastic molding that is circumferentially disposed about and circumscribes the circumferential edge of the glass substrate without overlapping onto or encroaching onto the first glass surface of the glass substrate.

40. The vehicular exterior rearview mirror assembly of claim 39, wherein the plastic molding is part of an attachment plate attached at a rear side of the frameless mirror reflective element opposite the first glass surface of the glass substrate.

41. The vehicular exterior rearview mirror assembly of claim 39, wherein the plastic molding comprises an outer curved surface that extends from adjacent to the first glass surface of the glass substrate and provides a curved transition between the plane of the first glass surface of the glass substrate and a plane of a less-curved portion of the plastic molding.

42. A vehicular exterior rearview mirror assembly, the vehicular exterior rearview mirror assembly comprising:
    a mounting arm having a first end configured for attachment at a side of an equipped vehicle and a second end distal from the first end;
    a mirror head disposed at the second end of the mounting arm, wherein the mirror head comprises a mirror reflective element;
    a powerfold actuator, wherein the powerfold actuator comprises an electrically-operable motor;
    wherein the powerfold actuator, when the electrically-operable motor is electrically operated, pivots the mirror head relative to the mounting arm between at least (i) a drive position where the mirror head is extended outward relative to the side of the equipped vehicle and (ii) a folded position where the mirror head is folded toward the side of the equipped vehicle;
    wherein the powerfold actuator comprises (i) a pivot post, the pivot post comprising a first end and a second end distal from the first end, (ii) a base portion fixed relative to the first end of the pivot post and fixed relative to the mounting arm, (iii) a first gear, (iv) a housing portion attached at the mirror head, (v) a lifter element non-rotatably disposed at the pivot post and (vi) a spring element disposed between the first gear and the second end of the pivot post, the spring element urging the first gear toward the base portion;
    wherein the electrically-operable motor, when electrically-operated, rotatably drives a second gear that is engaged with the first gear to pivot the housing portion relative to the first gear and the pivot post;
    wherein, with the mirror head at the drive position, the lifter element does not engage the first gear;
    wherein, during powered pivoting of the housing portion relative to the pivot post, the lifter element engages the first gear to limit rotation of the first gear relative to the pivot post;
    wherein, as the mirror head moves from the drive position toward the folded position, the housing portion moves upward relative to the base portion to raise the mirror head relative to the mounting arm, and wherein, as the housing portion moves upward relative to the base portion, the lifter element moves into engagement with the first gear to limit rotation of the first gear relative to the pivot post;
    wherein, during manual pivoting of the housing portion relative to the pivot post, the first gear and the housing portion pivot together and in tandem relative to the pivot post;
    wherein, with the mirror head at the drive position, the spring element acts on the base portion via the first gear and the housing portion; and
    wherein, during powered pivoting of the housing portion relative to the pivot post, the spring element acts on the base portion via the first gear and not via the housing portion or the lifter element.

43. The vehicular exterior rearview mirror assembly of claim 42, wherein, during manual pivoting of the housing portion relative to the pivot post, the housing portion moves upward relative to the base portion as a lower surface of the housing portion travels along a detent surface of the base portion.

44. The vehicular exterior rearview mirror assembly of claim 42, wherein the powerfold actuator comprises a resilient element at an upper end of the first gear that has a radially protruding tab that engages a corresponding tab at the housing portion to limit rotation of the housing portion relative to the first gear to stall the electrically-operable motor at stop locations.

45. The vehicular exterior rearview mirror assembly of claim 44, wherein the resilient element flexes radially inboard to allow movement of the radially protruding tab of the resilient element to avoid stalling the electrically-operable motor at other locations separate from the stop locations.

46. The vehicular exterior rearview mirror assembly of claim 42, wherein the lifter element is longitudinally movable along the base portion and the pivot post.

47. The vehicular exterior rearview mirror assembly of claim 42, wherein the lifter element comprises a lower cam surface configured to interface with a corresponding cam surface of the housing portion.

48. The vehicular exterior rearview mirror assembly of claim 47, wherein the corresponding cam surface of the housing portion is disposed at an inner surface of the housing portion and radially inboard of an upper cam surface of the housing portion.

49. A vehicular exterior rearview mirror assembly, the vehicular exterior rearview mirror assembly comprising:
a mounting arm having a first end configured for attachment at a side of an equipped vehicle and a second end distal from the first end;
a mirror head disposed at the second end of the mounting arm, wherein the mirror head comprises a mirror reflective element;
a powerfold actuator, wherein the powerfold actuator comprises an electrically-operable motor;
wherein the powerfold actuator, when the electrically-operable motor is electrically operated, pivots the mirror head relative to the mounting arm between at least (i) a drive position where the mirror head is extended outward relative to the side of the equipped vehicle and (ii) a folded position where the mirror head is folded toward the side of the equipped vehicle;
wherein the powerfold actuator comprises (i) a pivot post, the pivot post comprising a first end and a second end distal from the first end, (ii) a base portion fixed relative to the first end of the pivot post and fixed relative to the mounting arm, (iii) a first gear, (iv) a housing portion attached at the mirror head, (v) a lifter element non-rotatably disposed at the pivot post and (vi) a spring element disposed between the first gear and the second end of the pivot post, the spring element urging the first gear toward the base portion;
wherein the electrically-operable motor, when electrically-operated, rotatably drives a second gear that is engaged with the first gear to pivot the housing portion relative to the first gear and the pivot post;
wherein, as the mirror head moves from the drive position toward the folded position, the housing portion moves upward relative to the base portion to raise the mirror head relative to the mounting arm;
wherein the lifter element circumscribes the pivot post and is disposed radially inboard of an upper cam surface of the housing portion, and wherein the lifter element is longitudinally movable along the base portion and the pivot post according to movement of the housing portion along the pivot post;
wherein, with the mirror head at the drive position, (i) the lifter element does not engage the first gear and (ii) a lower cam surface of the first gear engages the upper cam surface of the housing portion;
wherein, during powered pivoting of the housing portion relative to the pivot post, the lifter element engages the first gear to limit rotation of the first gear relative to the pivot post;
wherein, with the mirror head at the drive position, the spring element acts on the base portion via the first gear and the housing portion; and
wherein, during powered pivoting of the housing portion relative to the pivot post, the spring element acts on the base portion via the first gear and not via the housing portion or the lifter element.

50. The vehicular exterior rearview mirror assembly of claim 49, wherein, with the mirror head at the drive position, a lower surface of the housing portion is nested with a detent surface of the base portion, and wherein, when the powerfold actuator operates to pivot the mirror head from the drive position toward the folded position, the first gear rotates relative to the pivot post and the lower cam surface of the first gear disengages from the upper cam surface of the housing portion and engages an upper cam surface of the base portion, and wherein, when the first gear disengages from the upper cam surface of the housing portion and engages the upper cam surface of the base portion, the spring element shifts from acting on the housing portion via the first gear to acting on the base portion via the first gear, and wherein, as the first gear rotates relative to the pivot post, the lower cam surface of the first gear travels along the upper cam surface of the base portion, and wherein, as the first gear rotates relative to the pivot post and the lower cam surface of the first gear travels along the upper cam surface of the base portion, the lower cam surface of the first gear is spaced from the upper cam surface of the lower housing and the lifter element.

51. The vehicular exterior rearview mirror assembly of claim 50, wherein rotation of the first gear relative to the pivot post is stopped by a cam of the upper cam surface of the base portion.

52. The vehicular exterior rearview mirror assembly of claim 51, wherein, with rotation of the first gear stopped, further operation of the electrically-operable motor rotates the housing portion relative to the pivot post and the base portion and the housing portion and the lifter element rise upward toward the first gear as the housing portion rotates relative to the pivot post and the base portion.

53. The vehicular exterior rearview mirror assembly of claim 52, wherein, as the housing portion rotates relative to the pivot post and the base portion and the housing portion and the lifter element rise upward toward the first gear, the spring element acts on the base portion via the first gear and not via the housing portion or the lifter element.

54. The vehicular exterior rearview mirror assembly of claim 52, wherein, as the housing portion and the lifter element rise upward toward the first gear, a receiving portion of the lifter element at least partially receives lower cams of the lower cam surface of the first gear to limit rotation of the first gear relative to the lifter element and the pivot post.

55. The vehicular exterior rearview mirror assembly of claim 54, wherein, with the lower cams of the lower cam surface at least partially received in the receiving portion of the lifter element, a first portion of each of the lower cams is received in the receiving portion and a second portion of each of the lower cams engages the upper cam surface of the base portion.

56. The vehicular exterior rearview mirror assembly of claim 49, wherein, during manual pivoting of the housing portion relative to the pivot post, the first gear and the housing portion pivot together and in tandem relative to the pivot post.

57. The vehicular exterior rearview mirror assembly of claim 49, wherein a lower cam surface of the first gear includes one or more cams disposed radially about a lower cam surface of the first gear.

58. The vehicular exterior rearview mirror assembly of claim 57, wherein each cam of the one or more cams of the lower cam surface of the first gear includes (i) an inner portion configured to engage a receiving portion of the lifter element and (ii) an outer portion radially outboard of the inner portion and configured to engage an upper cam surface of the housing portion.

\* \* \* \* \*